United States Patent
Kashima

(10) Patent No.: US 9,285,058 B2
(45) Date of Patent: Mar. 15, 2016

(54) REGULATOR VALVE FAULT CHECKING METHOD

(75) Inventor: Toru Kashima, Tokyo (JP)

(73) Assignee: Azbil Corporation, Tokyo (JP)

( * ) Notice: Subject to any disclaimer, the term of this patent is extended or adjusted under 35 U.S.C. 154(b) by 642 days.

(21) Appl. No.: 13/598,562

(22) Filed: Aug. 29, 2012

(65) Prior Publication Data

US 2013/0060523 A1  Mar. 7, 2013

(30) Foreign Application Priority Data

Sep. 2, 2011  (JP) .................................. 2011-191313

(51) Int. Cl.
| | | |
|---|---|---|
| G06F 11/30 | (2006.01) | |
| F16K 37/00 | (2006.01) | |
| G05B 23/02 | (2006.01) | |
| G21C 17/00 | (2006.01) | |

(52) U.S. Cl.
CPC ........ F16K 37/0083 (2013.01); G05B 23/0243 (2013.01)

(58) Field of Classification Search
CPC .... G01F 25/00; G01F 15/005; G16K 37/0083
See application file for complete search history.

(56) References Cited

U.S. PATENT DOCUMENTS

2010/0229967 A1* 9/2010 Yasuda et al. ................. 137/486

FOREIGN PATENT DOCUMENTS

| JP | S62-28118 | 2/1987 |
|---|---|---|
| JP | H7-77488 | 3/1995 |
| JP | 2005-538462 | 12/2005 |
| JP | 2006-520038 | 8/2006 |
| WO | 2004/025384 | 3/2004 |
| WO | 2004/074947 | * 9/2004 |

* cited by examiner

Primary Examiner — Phuong Huynh
(74) Attorney, Agent, or Firm — Troutman Sanders LLP

(57) ABSTRACT

An operating device pressure Po into a regulator valve and a degree of opening X from the regulator valve are sampled. A speed of change vPo (k) of the Po (k) is calculated from the current Po (k) and the previous Po (k −1). A speed of change vX (k) of the X (k) is calculated from the current X (k) and the previous X (k −1). If both vPo (k) and vX (k) are small, then a weighting value w1 (k) is set to 1 (and set to 0 otherwise), where a fault check indicator Fq (i) for each degree-of-opening category i during a fault check evaluation time interval is calculated from the vPo (k) and vX (k) when w1 (k) is 1 and from a linear approximation formula F1 that indicates the steady-state input/output relationships in the regulator valve when operating properly.

10 Claims, 28 Drawing Sheets

REGULATOR VALVE FAULT CHECKING METHOD

CROSS-REFERENCE TO RELATED APPLICATION

The present application claims priority to Japanese patent application No. 2011-191313 filed on Sep. 2, 2011, the entire content of which is hereby incorporated by reference.

TECHNICAL FIELD

The present disclosure relates to a method and device for checking for faults in regulator valves for regulating the flows of fluids.

RELATED ART

Conventionally, in chemical plants, and like, positioners have been provided in regulator valves used in the flow rate processes thereof, to adjust the opening of regulator valves using the positioners. The positioner would be provided with a calculating portion for calculating the difference between an opening setting value sent from a higher-level device and an actual opening value, fed back from the regulator valve, to generate an electric signal, as a control output, in accordance with this difference, an electro-pneumatic converting device for converting, into an air pressure signal, the control output generated by the calculating portion, and a pilot relay for amplifying this air pressure signal, converted by the electro-pneumatic converting device, and outputting it to an operating device of the regulator valve as an air pressure signal. See, for example, Japanese Unexamined Utility Model Registration Application Publication S62-28118.

FIG. 23 shows the flow of input/output signals in a system wherein a positioner is combined with a regulator valve. In this figure, 100 is the positioner and 200 is the regulator valve, where the positioner 100 is provided with an electrical module 1, an EPM (electro-pneumatic converter module) 2, and a pilot relay (an air pressure amplifying module) 3.

The electrical module 1 inputs the opening setting signal Iin and the opening X of the valve that is fed back from the regulator valve 200, to generate an EPM driving signal Duty as the control output. The EPM 2 inputs the EPM driving signal Duty from the electrical module 1 to convert the EPM driving signal Duty into a nozzle back pressure Pn. The pilot relay 3 inputs the nozzle back pressure Pn from the EPM 2 to generate an operating device pressure Po from the nozzle back pressure Pn. The regulator valve 200 inputs the operating device pressure Po from the positioner 100 to adjust the opening X of the valve in accordance with the operating device pressure Po.

FIG. 24 shows a diagram of a linear approximation of the steady-state input/output relationship between the individual modules within the positioner 100 and the regulator valve 200 when operating properly. FIG. 24(a) shows the input/output relationship in the electrical module 1 (the relationship between the opening setting signal Iin and the EPM driving signal Duty); FIG. 24(b) shows the input/output relationship in the EPM 2 (the relationship between the EPM driving signal Duty and the nozzle back pressure Pn); FIG. 24(c) shows that the input/output relationship in the pilot relay 3 (the nozzle back pressure Pn and the operating device pressure Po); and FIG. 24(d) shows the input/output relationship in the regulator valve 200 (the relationship between the operating device pressure Po and the degree of opening X). Note that this example is an example of a forward operating type (air-to-open) wherein the opening is larger in accordance with the amount of air that goes into the regulator valve 200.

[Fault Checking in Regulator Valves]

In the regulator valve 200 it is possible to detect the fluid reactive force that acts on the valve shaft (the force from the process fluid) from the relationship between the operating device pressure Po and the degree of opening X. FIG. 25 shows the change in the input/output relationship of the regulator valve 200 when there is a fluid reactive force. In this figure, I is a characteristic showing the steady-state input/output relationship when operating properly (the characteristic when there is no load), where this input/output relationship is modified by the occurrence of the fluid reactive force so to be as shown by characteristic I'.

When there is no load, the relationship between the operating device pressure Po and the degree of opening X exhibits a balance between the spring force and the force of the air pressure. When a fluid reactive force is produced, that balance is disrupted. Consequently, it is possible to detect a difference in the operating device pressure Po by comparing to the state wherein no reactive force is produced (when there is no load). It is possible to detect fluid pressures outside of the use range through monitoring this difference.

Moreover, it is possible to detect aberrations in the frictional force that acts on the valve shaft from the relationship between the operating device pressure Po and the degree of opening X. See, for example, Japanese Translation of PCT International Application 2006-520038 and Japanese Translation of PCT International Application 2005-538462. FIG. 26(a) shows the hysteresis characteristics of the input/output relationship between the operating device pressure Po and the degree of opening X when operating properly. The input/output relationship will be different when the operating device pressure Po changes in the rising direction and when it changes in the falling direction, producing a hysteresis width W between the characteristic in the rising direction and the characteristic in the falling direction. As shown in FIG. 26(b), this hysteresis width W will vary depending on the frictional force. Consequently, it is possible to check for a fault through comparing with the hysteresis width W from a time of proper operation. Note that multiplying one half of the hysteresis width W by the operating device diaphragm surface area produces the static frictional force, where this static frictional force may also be used as an indicator value.

However, in the regulator valve fault checking method set forth above, when performing fault checking of the regulator valve using data from the processing operation during processing operations, in some cases it is not possible to check well for faults in the regulator valve.

For example, let us consider the case of a fault (a large fluid reactive force) in the regulator valve illustrated in FIG. 25. In this case, when the regulator valve is moved quickly during a processing operation, then, due to a delay, the input/output relationship will deviate greatly from characteristic I (the steady-state model) that shows the steady-state input/output relationship when operating properly. (See FIG. 27.) Because of this, there will be an incorrect diagnosis that there is a fault in the regulator valve.

Moreover, let us consider a fault (a large frictional force) in the regulator valve, in FIG. 26. In this case, with the technology set forth in Japanese Translation of PCT International Application 2006-520038 and Japanese Translation of PCT International Application 2005-538462, data will also be used wherein the degree of opening X and/or the operating device pressure Po is moved rapidly. When such data becomes large, the hysteresis width W that is calculated becomes large, even if there is actually no change in the frictional force. (See FIG. 28.) Because of this, there will be an incorrect diagnosis that there is a fault in the regulator valve.

Note that one may consider creating a dynamic model that includes the delay of the regulator valve, and performing the fault check based on the dynamic model that has been produced. However, this method requires an excessively large amount of work to produce highly accurate dynamic models, such as to produce the equations of motion (referencing, for example, Japanese Unexamined Patent Application Publication H07-77488), and the amount of calculation overhead during operation will also be large, so the fault checks cannot be performed easily.

The present disclosure addresses such problems, and the object thereof is to provide a method and device for checking for faults in positioners, able to perform fault checks of regulator valves easily and accurately during processing operations.

SUMMARY

The present disclosure, in order to achieve such an object, discloses a regulator valve fault checking method for performing fault checking of a regulator valve for regulating the flow of a fluid, including a step of sampling periodically a signal that is inputted into the regulator valve and, as an output from the regulator valve, a degree of valve opening, a step of calculating a speed of change of the input signal that has been sampled, a step of calculating a speed of change of the degree of valve opening that has been sampled, a step of calculating a weighting depending on a combination of the speed of change of the input signal and the speed of change of the degree of valve opening, based on a weighting function that has been established in advance, and a step of performing fault checking of the regulator valve based on the input signal and the degree of valve opening that have been sampled and on the weighting that has been calculated.

For example, in the present disclosure, if the input signal into the regulator valve is an operating device pressure, then the operating device pressure is sampled at regular intervals as the input signal into the regulator valve, the valve opening is sampled at regular intervals as the output from the regulator valve, and the speed of change of the operating device pressure that has been sampled, and the speed of change of the valve opening that has been sampled, are calculated. Given this, a weighting is calculated in accordance with a combination of the speed of change of the operating device pressure and the speed of change of the valve opening, based on weighting functions established in advance, and fault checks of the regulator valve are performed based on the operating device pressures and degrees of opening, which have been sampled, and on the calculated weighting.

For example, in the present disclosure, the weighting is defined as 1 if the speed of change of the operating device pressure and the speed of change of the valve opening are both low, and the weighting is defined as 0 otherwise, and fault checking for the regulator valve is performed using the operating device pressures and degrees of valve opening wherein the speeds of change are low. Doing this eliminates data that are very different from the characteristic that indicates the steady-state input/output relationship, when operating properly, during processing operation, and eliminates data that are very different from the width of hysteresis during proper operation, making it possible to perform fault checking of the regulator valve.

While in the present disclosure the weighting is calculated in accordance with a combination of the speed of change of the input signal and the speed of change of the valve opening, based on a weighting function that is established in advance, a weighting function may be used wherein the weighting is divided into a weighting component that is in accordance with the speed of change of the input signal and a weighting component that is in accordance with the speed of change of the valve opening, and the weighting function may be one that combines the weighting component that is in accordance with the speed of change of the input signal and the weighting component that is in accordance with the speed of change of the degree of opening. Moreover, the weightings need not necessarily be binary values of 0 and 1, but instead they may be weightings that are larger as the speeds of change are smaller.

Moreover, the present disclosure also discloses systems wherein the positioner is combined into the concept of the regulator valve. That is, it is possible to consider the entire system wherein a positioner and a regulator valve are combined as being a single regulator valve. In this case, the opening setting signal that is the input signal into the positioner would correspond to an input signal into the regulator valve.

In the present disclosure, the input signal into the regulator valve and the valve opening, as an output from the regulator valve, are sampled periodically, the speed of change of the input signal that is sampled and the speed of change of the valve opening that is sampled are calculated, a weighting is calculated in accordance with a combination of the speed of change of the input value and the speed of change of the valve opening, based on a weighting function that is established in advance, and fault checking of the regulator valve is performed based on the input signal and valve opening that are sampled and on the weighting that is calculated, thus making it possible to perform fault checking of the regulator valve easily and accurately through eliminating the data that is greatly different from the characteristic that indicates the steady-state input/output relationship when operating properly, and eliminating data that deviates greatly from the width of hysteresis when operating properly, during the processing operation.

DETAILED DESCRIPTION

Embodiments according to the present disclosure will be explained in detail below based on the drawings. Here an example wherein fault checking is performed by calculating a fluid reactive force, as a fault check indicator value, from the input/output signals (the operating device pressure Po and the degree of opening X) of a regulator valve will be explained first as a first embodiment, after which an example wherein fault checking is performed by calculating a hysteresis width, as a fault check indicator value, from the input/output signals (the operating device pressure Po and the degree of opening X) will be explained as a second embodiment.

First Embodiment

Figure 1:
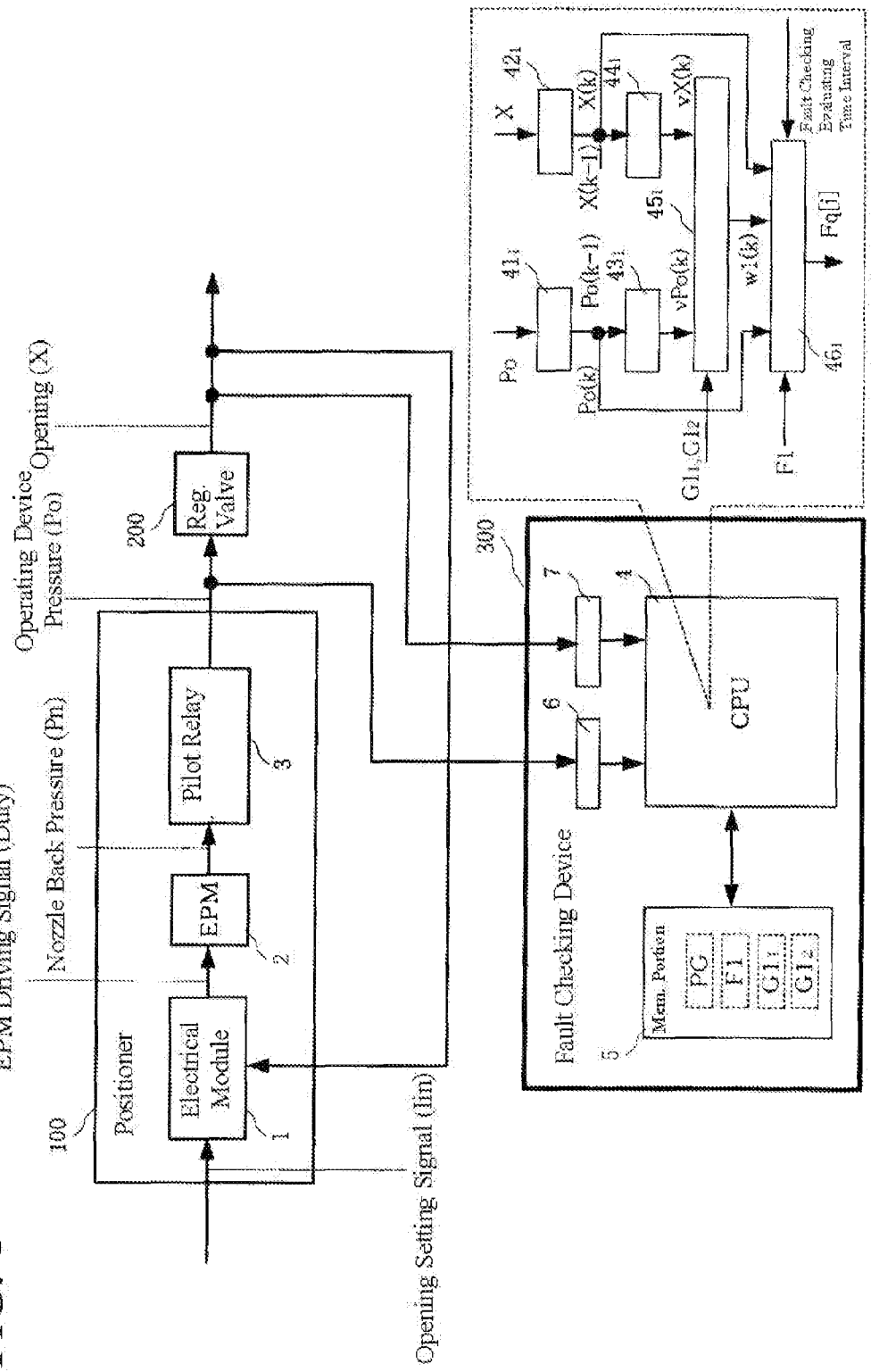
FIG. 1 is a diagram illustrating the structure of critical components in one example of embodiment (a first example of embodiment) of a fault checking device that applies the fault checking method for the regulator valve according to the present disclosure.

FIG. 1 shows the structure of the critical portions of a fault checking device 300 for performing a fault check of a regulator valve 200 with the flow reactive force as the fault check indicator value. This fault checking device 300 includes a CPU 4, a memory portion 5 that is a ROM, a RAM, or the like, and interfaces 6 and 7. Note that this fault checking device 300 may be provided within a positioner 100 or a regulator valve 200, or may be provided outside of the positioner 100 and the regulator valve 200. FIG. 1 shows an example wherein it is provided on the outside of the positioner 100 and the regulator valve 200.

The operating device pressure Po that is the input signal into the regulator valve 200 is branched and inputted through the interface 6 into the CPU 4, and the degree of opening X, which is the output from the regulator valve 200, is branched and inputted through the interface 7 into the CPU 4. The CPU 4 operates in accordance with a program PG that is stored in the memory portion 5.

In addition to the program PG referenced above, a linear approximation formula F1 that represents the steady-state input/output relationship, when operating properly, of the regulator valve 200 (the relationship between the operating device pressure Po and the degree of opening X (when there is no load)), and weighting functions $G1_1$ and $G1_2$, for calculating weightings in accordance with combinations of the speed of change of the operating device pressure Po and the speed of change of the degree of opening X, are stored in the memory portion 5.

[Linear Approximation Formula F1]

In the first embodiment, the linear approximation formula F1 that indicates the steady-state input/output relationship, when operating properly, in the regulator valve 200 is calculated from the design specification of the regulator valve 200. In this case, the linear approximation formula F1 wherein the degree of opening varies between 0 and 100% with a spring range between 80 and 240 kPa is established as X=a1×Po+b1 (where a1=0.625 and b1=−50), and stored in the memory portion 5.

Figure 2:
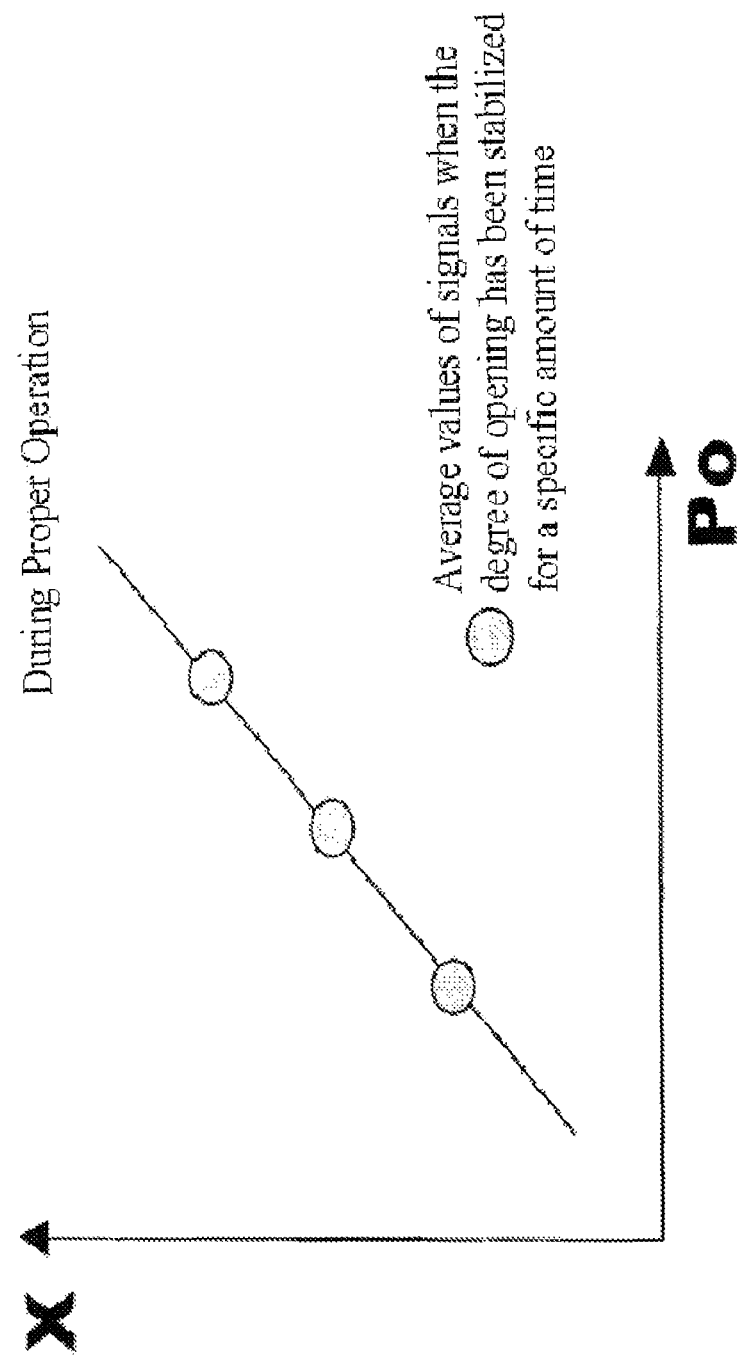
FIG. 2 is a diagram for explaining the method for calculating the steady-state input/output relationships when the regulator valve is operating properly when, for example, there are no regulator valve design specifications.

Note that when there is no design specification for the regulator valve 200, or the like, the average values of the operating device pressure Po and the degrees of opening X may be taken in a state wherein there are proper operations, such as immediately after maintenance, after a specific time interval of settling in states wherein the opening setting signal Iin is at 25%, 50%, and 75% (referencing FIG. 2), to perform a calculation from three points using the least squares method. In this case, that which is caused to be in the steady-state need not necessarily be three points. Moreover, a non-linear approximation (such as a non-linear regression equation such as multivariate approximation or a support vector machine, or the like), may be used instead of the linear approximation.

[Weighting Functions $G1_1$ and $G1_2$]

In the first embodiment, in the weighting functions $G1_1$ and $G1_2$ for calculating the weightings in accordance with combinations of the speed of change of the operating device pressure Po and the speed of change of the opening X, $G1_1$ is established as a weighting function for obtaining a first weighting component wPo from the speed of change of the operating device pressure Po, and $G1_2$ is established as a weighting function for obtaining a second weighting component wX from the speed of change of the degree of opening X. A weighting w1 is calculated in accordance with the combination of the speed of change of the operating device pressure Po and the speed of change of the degree of opening X as w1=wPo×wX, as described below, from the weighting components wPo and wX obtained from the weighting functions $G1_1$ and $G1_2$.

FIG. 3(a) shows one example of the weighting function $G1_1$. In the first embodiment, as illustrated in FIG. 3(a), the speed of change of the operating device pressure Po (kPa) is defined as vPo (kPa/sec), and if the absolute value of this speed of change of vPo is no more than a threshold value Poth, then wPo is 1, and otherwise it is 0.

FIG. 3(b) shows one example of the weighting function $G1_2$. In the first embodiment, as illustrated in FIG. 3(b), the speed of change of the degree of opening X (%) is defined as vX (%/sec), where, in a range wherein the absolute value of the speed of change vX is no more than a threshold value Xth, wX is 1, and otherwise it is 0.

Here the threshold values Poth and Xth are established with the tolerance value for the speed of change vPo of the operating device pressure Po as Poth, and the speed of change vX of the degree of opening X that is produced by the delay when the operating device pressure Po is increased to Poth is established as Xth. Note that the tolerance value Poth of the speed of change vPo of the operating device pressure Po indicates a tolerance value for the speed of change vPo wherein there is no risk of an incorrect diagnosis as a fault in the regulator valve due to this delay. The tolerance value Poth may be obtained through repeated experimentation.

[Fault Checks During Processing Operations]

Figure 4:
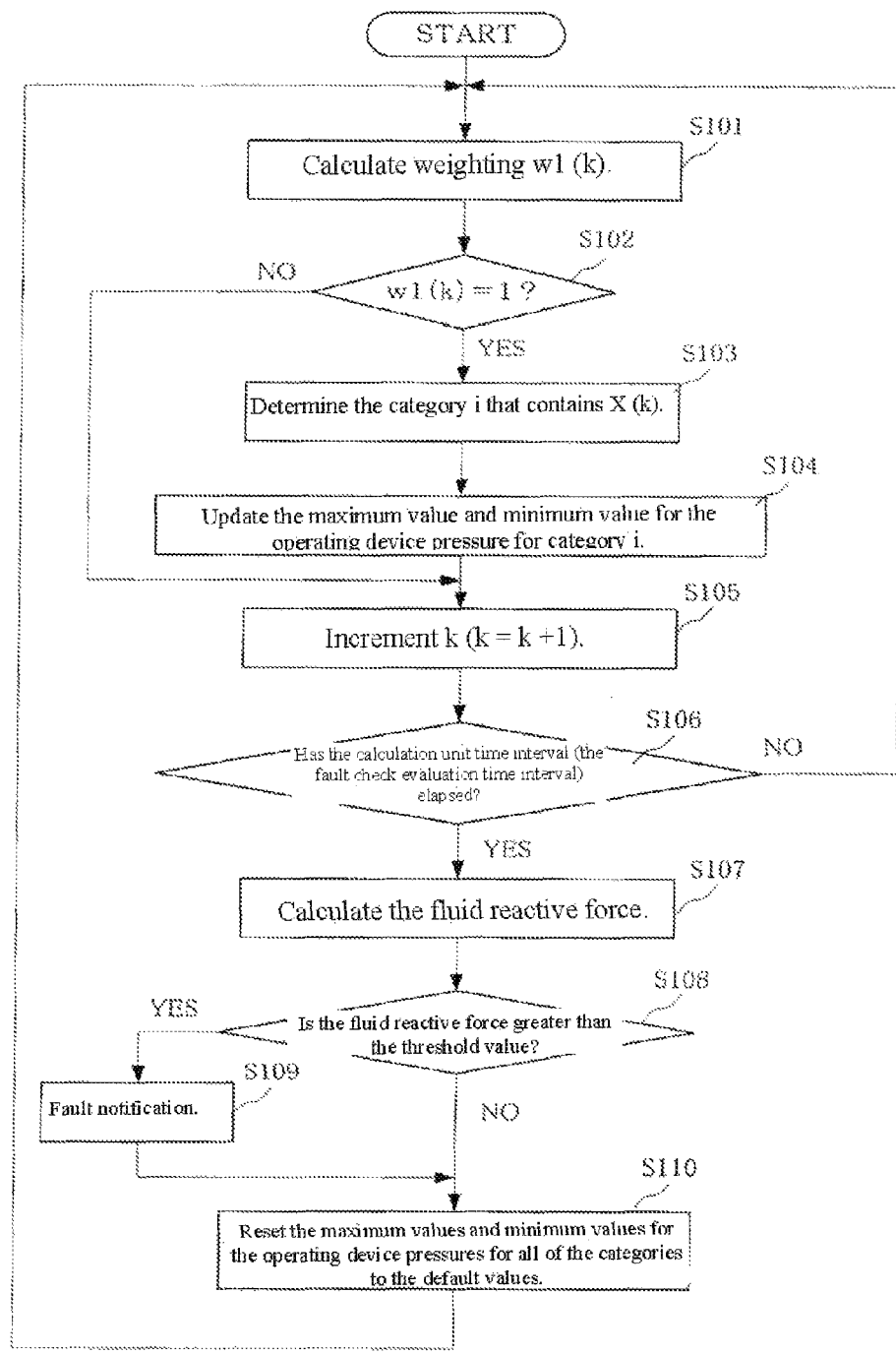
FIG. 4 is a flowchart for the fault checking process performed by the CPU in the fault checking device according to the first embodiment.

During processing operations, the CPU 4 periodically reads in the operating device pressure Po that is inputted into the regulator valve 200 and the degree of opening X that is outputted from the regulator valve 200, to perform the fault checking on the regulator valve 200. FIG. 4 shows a main flowchart for the fault checking process that is performed by the CPU 4.

Figure 5:
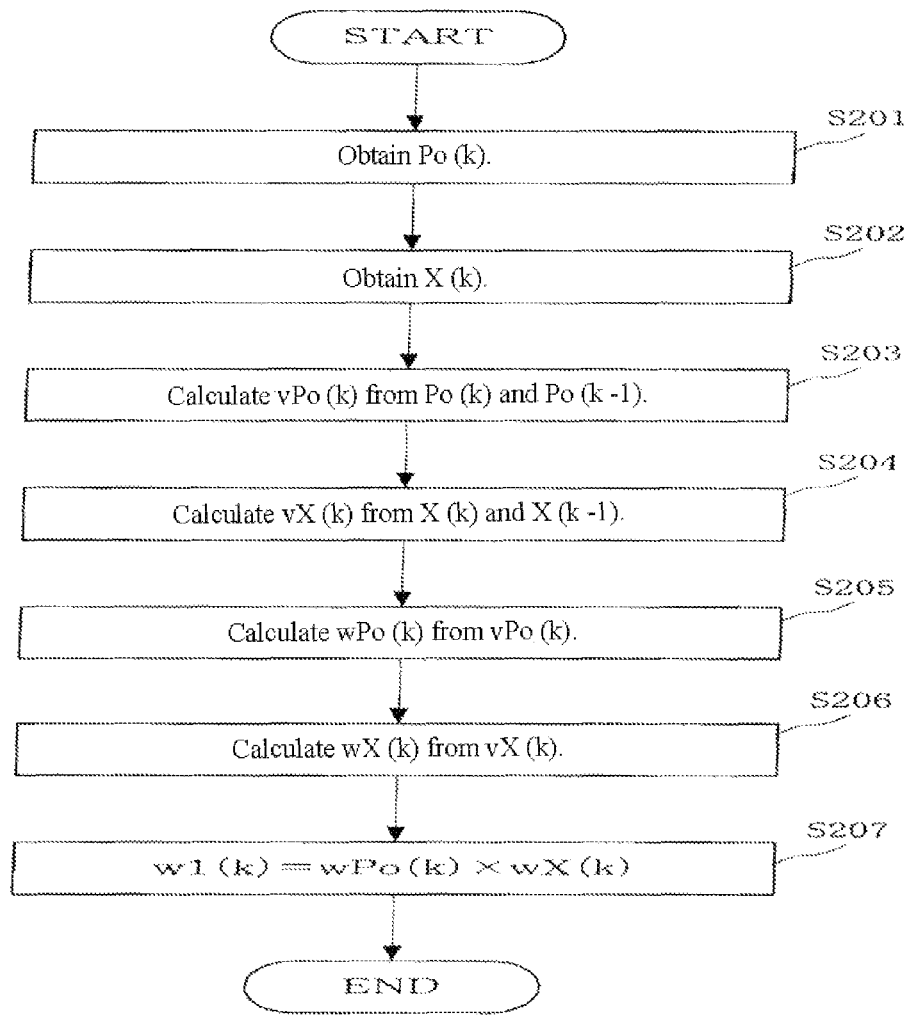
FIG. 5 is a diagram illustrating a subroutine for a process for calculating a weighting w1 (k) in the flowchart shown in FIG. 4.

The CPU 4 reads in the operating device pressure Po (k) and the degree of opening X (k), calculates the speed of change of the operating device pressure Po and the speed of change of the degree of opening X that have been read in, and calculates a weighting w1 (k) in accordance with the combination of the speed of change of the operating device pressure Po and the speed of change of the degree of opening X that have been calculated (Step S101). The subroutine for the process that is performed in Step S101 is illustrated in FIG. 5.

The CPU 4 reads in the operating device pressure Po (k) and the degree of opening X (k) at the current sampling interval (the $k^{th}$ sampling interval) (Step S201 and S202), and calculates, as vPo (k) the speed of change in the operating device pressure Po (k) from the current operating device pressure Po (k) and the previous operating device pressure Po (k −1) (Step S203). Moreover, it calculates, as vX (k) the speed of change of the degree of opening X (k) from the current degree of opening X (k) and the previous degree of opening X (k −1) (Step S204).

In this case, with the sampling interval defined as T (sec), vPo (k) (kPa/sec) can be calculated by Equation (1), below, and vX (k) (%/sec) can be calculated through Equation (2), below:

$$vPo(k)=(Po(k)-Po(k-1))/T \qquad (1)$$

$$vX(k)=(X(k)-X(k-1))/T \qquad (2)$$

The CPU 4 then calculates, from the speed of change vPo (k) of the operating device pressure Po (k), a weighting component wPo (k) that depends on the speed of change vPo (k) following the weighting function $G1_1$ (FIG. 3(a)) that is stored in the memory portion 5 (Step S205). At this time, if the absolute value of the speed of change vPo (k) is no greater than the threshold value Poth, then wPo (k) will equal 1, but if the absolute value of the speed of change vPo (k) exceeds the threshold value Poth, then wPo (k) will equal 0.

The weighting component wX (k) that depends on the speed of change vX (k) is calculated from the speed of change vX (k) of the degree of opening X (k) following the weighting function $G1_2$ (FIG. 3(b)) that is stored in the memory portion 5 (Step S206). In this case, if the absolute value of the speed of change vX (k) is equal to or less than the threshold value Xth, then wX (k) will equal 1, but if the absolute value of the speed of change vX (k) exceeds the threshold value Xth, then wX (k) will equal 0.

Following this, the CPU 4 calculates, from the weighting component wPo (k), calculated in Step S205, and the weighting component wX (k), calculated in Step S206, the weighting w1 (k) that depends on the combination of the speed of change vPo (k) of the operating device pressure Po (k) and the speed of change vX (k) of the degree of opening X (k) as w1 (k)=wPo (k)×wX (k) (Step S207).

In this case, because w1 (k) is calculated as w1 (k)=wPo (k)×wX (k), the weighting w1 (k) will only be 1 when the conditions in the Conditional Equation (3), below, are satisfied, and the weighting w1 (k) will be 0 otherwise:

$$\text{If } (|vPo(k)| \le Poth) \text{ AND } (|vX(k)| \le Xth) \qquad (3)$$

That is, the weighting w1 (k) will be 1 only when the absolute value of the speed of change vPo (k) of the operating device pressure Po (k) is no more than Poth and the absolute value of the speed of change vX (k) of the degree of opening X (k) is no more than Xth, and otherwise the weighting w1 (k) will be 0.

[When $w1(k)=0$]

The CPU 4 then checks whether or not the weighting w1 (k) is 1 (Step S102 (FIG. 4)), where if the weighting w1 (k) is not 1 (Step S102: NO), then k is incremented (Step S105), and after confirming that a calculation unit time interval (fault check evaluation time interval) that has been set in advance has not elapsed (Step S106: NO), processing returns to Step S101. Note that in this example, the fault check evaluation time interval in Step S106 is one day.

[When $w1(k)=1$]

Figure 6:
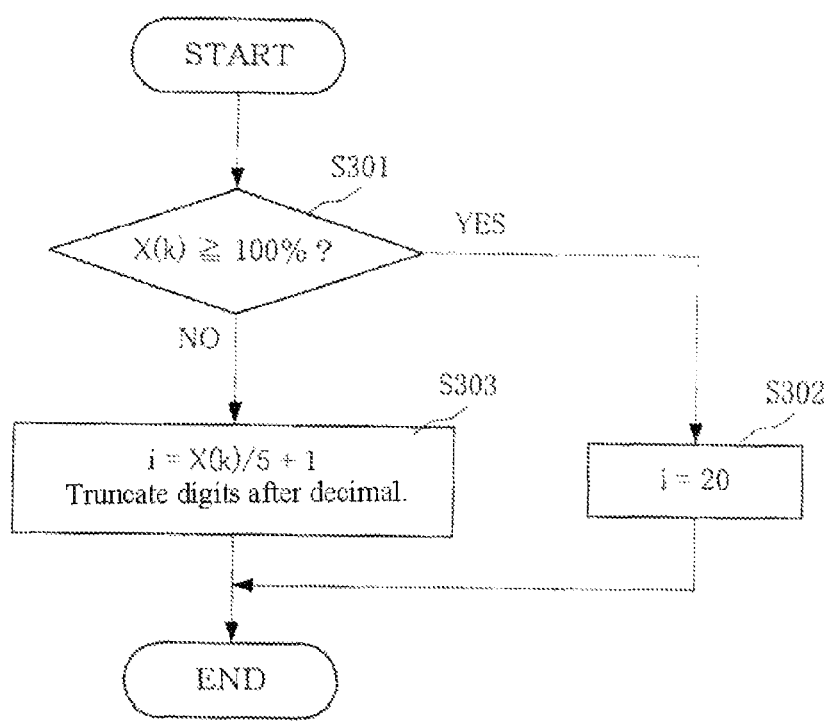
FIG. 6 is a diagram illustrating a subroutine for a process for determining the category to which the degree of opening X (k) belongs in the flowchart shown in FIG. 4.

If the weighting w1 (k) is 1 (Step S102: YES), then the CPU 4 establishes the category i to which the degree of opening X (k) belongs (Step S103). FIG. 6 shows the subroutine for the process that is performed in Step S103.

The CPU 4 first checks whether or not the degree of opening X (k) is X (k)≧100% (Step S301). If here the degree of opening X (k) is equal to or greater than 100% (Step S301: YES), then the category i is set to i=20 (Step S302). If the degree of opening X (k) is not equal to or greater than 100% (Step S301: NO), then the category i is set to i=X (k)/5+1 (Step S303). Note that in the calculated value for i=X (k)/5+1, the digits after the decimal are truncated. As a result, if the opening X (k) is assumed to take a value between 0 and 100%, then the range of 0 through 100% is divided into 20 categories, each having a width of a 5% opening.

Figure 7:
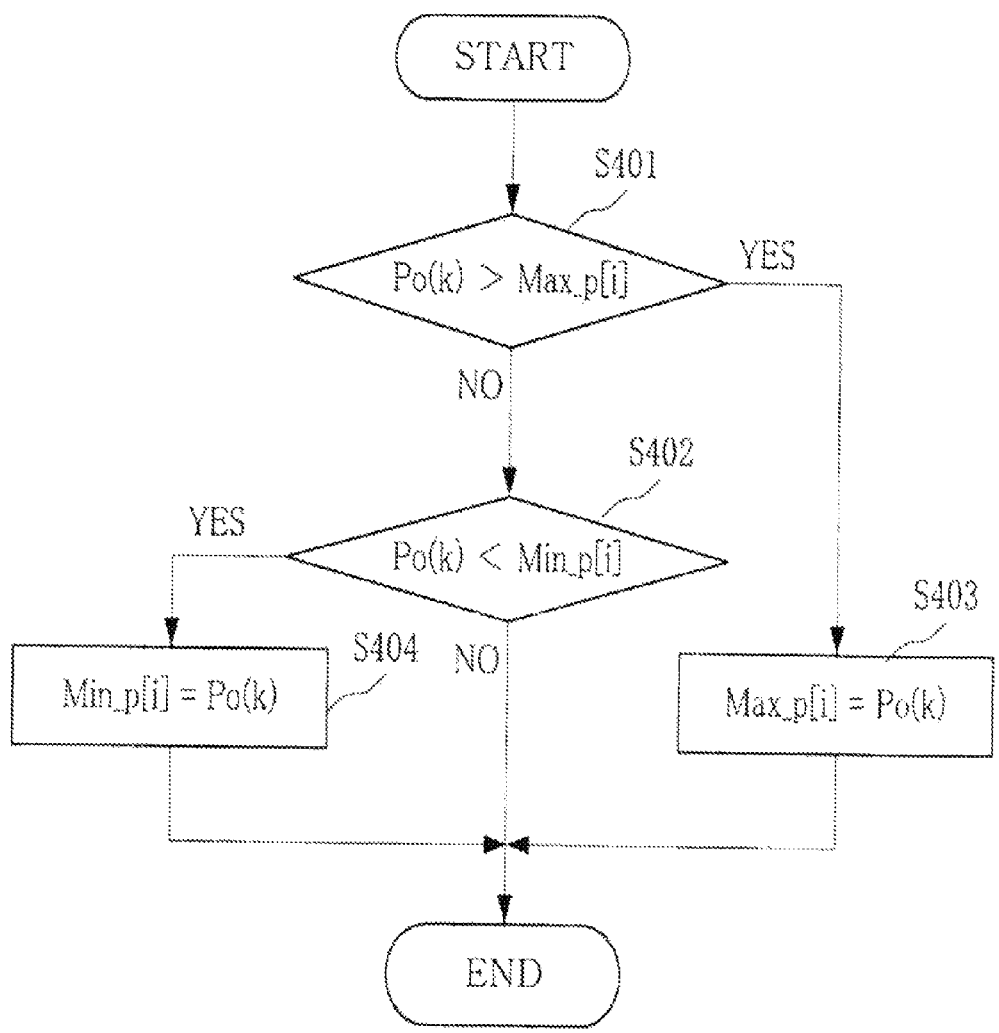
FIG. 7 is a diagram illustrating a subroutine for a process for updating the maximum value and minimum value of the operating device pressure in a category i in the flowchart shown in FIG. 4.

Following this, the CPU 4 updates the maximum value and minimum value for the operating device pressure Po in the category i to which the opening X (k) belongs (Step S104 (FIG. 4)). FIG. 7 shows the subroutine for the process that is performed in Step S104. Note that in this subroutine, Max_p (i) indicates the maximum value for the operating device pressure Po within the category i, and Min_p (i) indicates the minimum value for the operating device pressure Po in the category i. The default values for Max_p (i) and Min_p (i) are described below.

The CPU 4 first checks whether or not the operating device pressure Po (k) is Po (k)>Max_p (i) (Step S401). If here Po (k) is greater than Max_p (i) (Step S401: YES), then Po (k) is used as the new Max_p (i) (Step S403). If Po (k) is not greater than Max_p (i) (Step S401: NO), then a check is performed as to whether or not Po (k)<Min_p (i) (Step S402). If here Po (k) is less than Min_p (i) (Step S402: YES), then Po (k) is used as the new Min_p (i) (Step S404). If Po (k) is no more than Max_p (i) and no less than Min_p (i) (Step S402: NO), then neither Max_p (i) nor Min_p (i) is updated.

Given this, the CPU 4, after performing the processes for updating Max_p (i) and Min_p (i), increments k (Step S105 (FIG. 4)), and, upon confirming that the fault check evaluation time interval has not elapsed (Step S106: NO), returns to Step S101.

Figure 10:
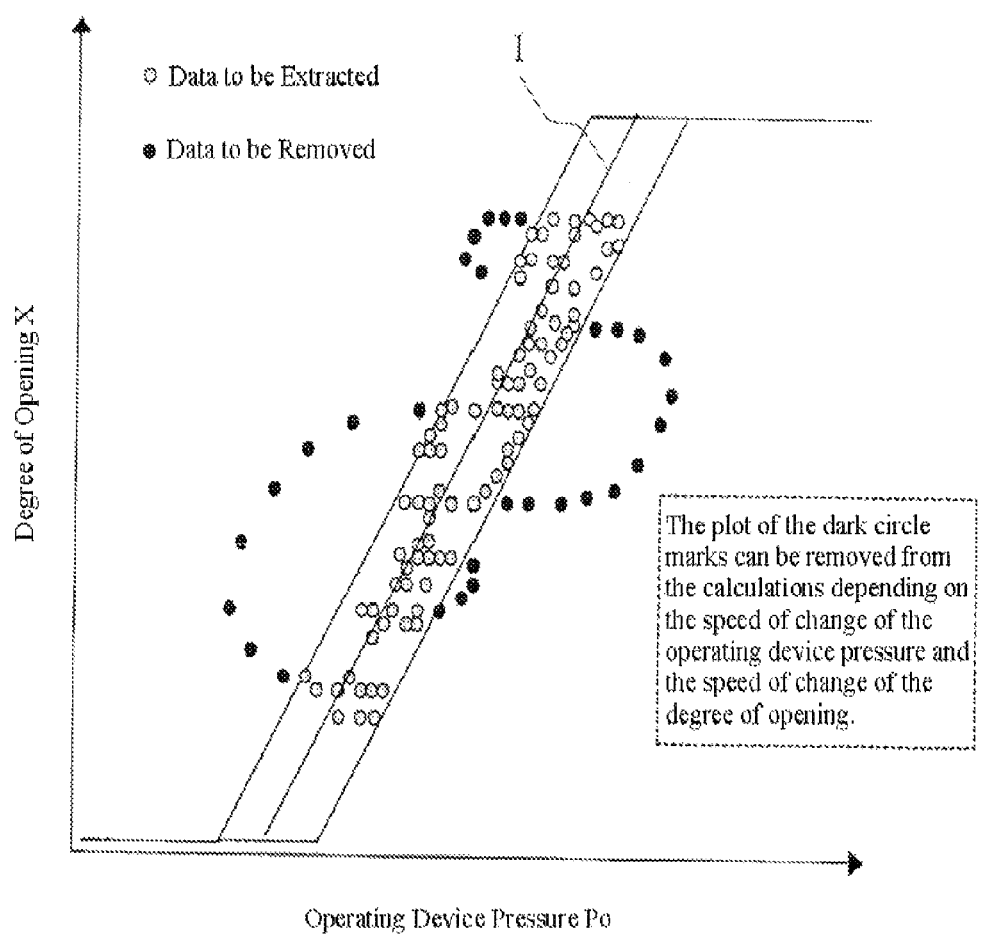
FIG. 10 is a diagram illustrating data that is excluded and data that is extracted as valid data by the weighting w1 (k).

Through repeating Step S101 through S106 the operating device pressures Po (k) and the degrees of opening X (k) wherein the weighting w1 (k) is zero are excluded, and only those operating device pressures Po (k) and degrees of opening X (k) wherein the weighting w1 (k) is 1 will be extracted (referencing FIG. 10), where these extracted data are used as valid data (data subject to extraction), and a maximum value Max_p (i) and a minimum value Min_p (i) for the operating device pressures Po within the category i are calculated for each category i.

[When the Fault Check Evaluation Time Interval has Expired]

Figure 8:
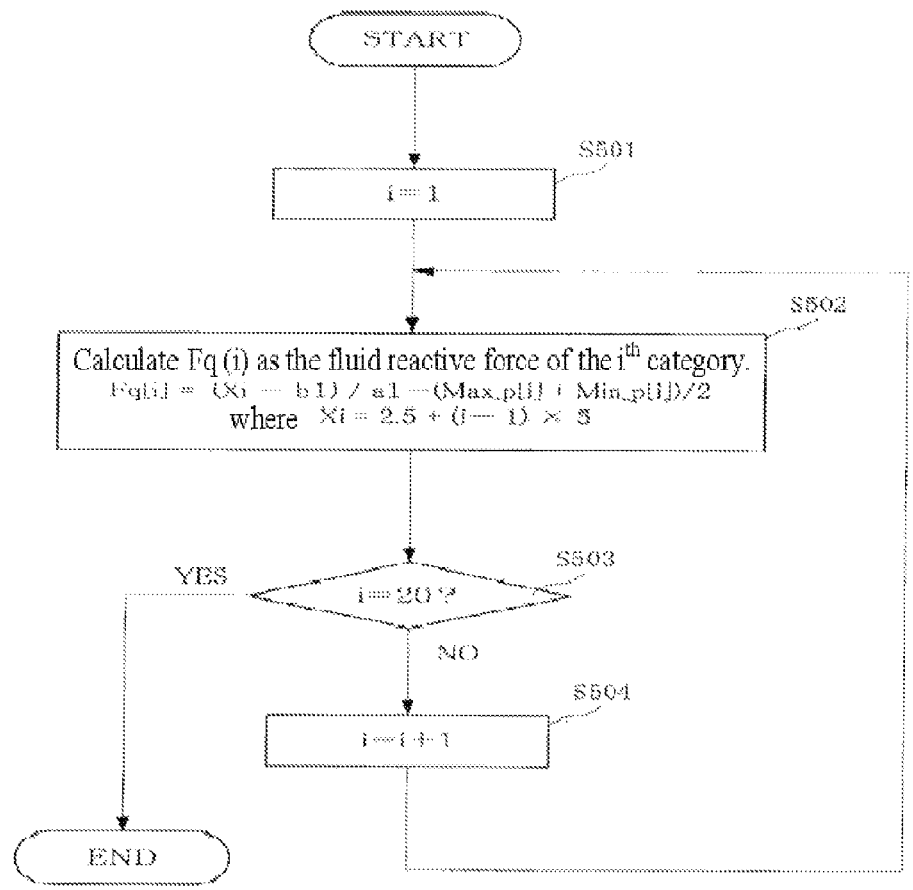
FIG. 8 is a diagram illustrating a subroutine of a process for calculating the fluid reactive force of each category i in the flowchart shown in FIG. 4.

When the fault check evaluation time interval has expired (Step S106: YES), that is, when the incremented value of k in Step S105 indicates that the fault check evaluation time interval has expired, then the CPU 4 calculates the fluid reactive force in each category i as a fault check indicator value (Step S107). FIG. 8 shows the subroutine for the process that is performed in Step S107.

The CPU 4 first sets i=1 (Step S501). Given this, with Fq (i) defined as the fluid reactive force for the i=1 category, the maximum value Max_p (i) and the minimum value Min_p (i) for the operating device pressure Po in that category i are substituted into Equation (4), below, to calculate the fluid reactive force Fq (i) for the i=1 category (Step S502). Note that Xi=2.5+(i−1)×5:

$$Fq(i) = (Xi - b1)/a1 - (Max\_p(i) + Min\_p(i))/2 \quad (4)$$

Figure 11:
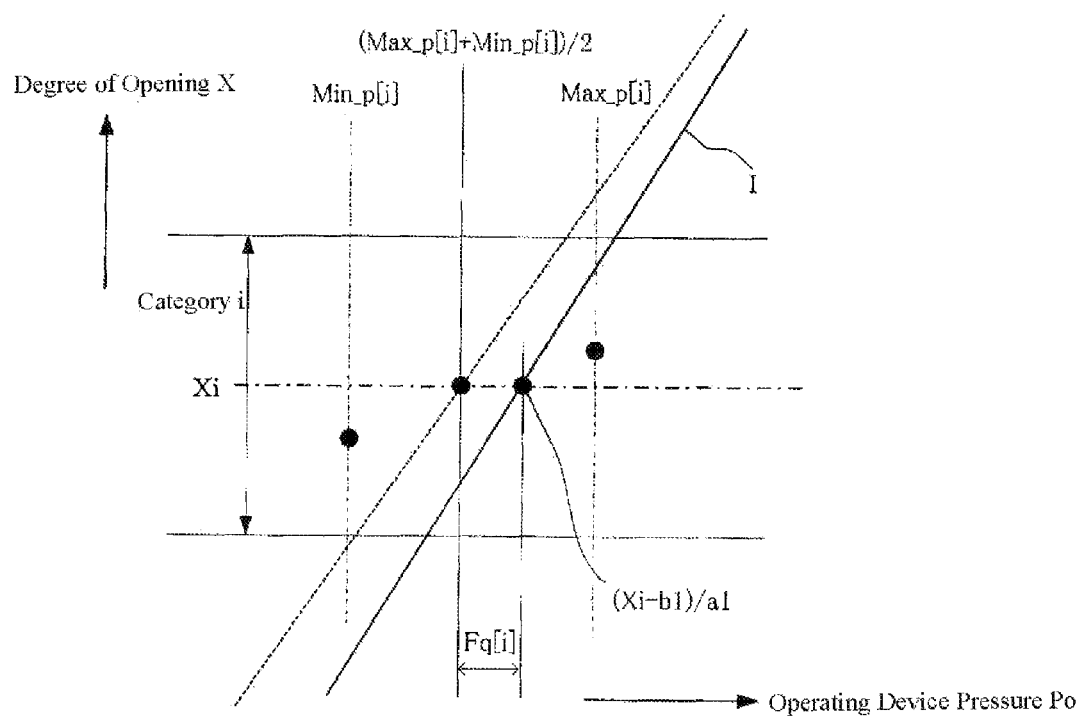
FIG. 11 is a diagram illustrating a situation wherein a difference is calculated, on the Po axis within data collected showing the input/output relationship (representative values) from the data, from when operating properly, in the category i.

Equation (4), above, represents the difference, on the Po axis, between the steady-state input/output relationship, when operating properly, in the regulator valve 200, indicated by the linear approximation formula F1 that is stored in the memory portion 5, and the data (the substituted values) that indicate the input/output relationship gathered in category i. That is, the central value ((Max_p (i)+Min_p (i))/2) between the maximum value Max_p (i) and the minimum value Min_p (i) for the operating device pressure Po in category i is used as a representative value for the operating device pressure Po in category i, and the central value (Xi) for the range of degrees of opening in category i is used as a representative value for the degree of opening X in category i, and the difference between the representative value and the data when operating properly is shown on the Po axis (referencing FIG. 11). This difference is calculated as the fluid reactive force Fq (i) for category i. Note that Fq (i) is a pressure (kPa), but the units can be converted from a pressure (kPa) into a force (N) through multiplying by the surface area of the diaphragm of the operating device (m$^2$)×10$^{-3}$.

Figure 12:
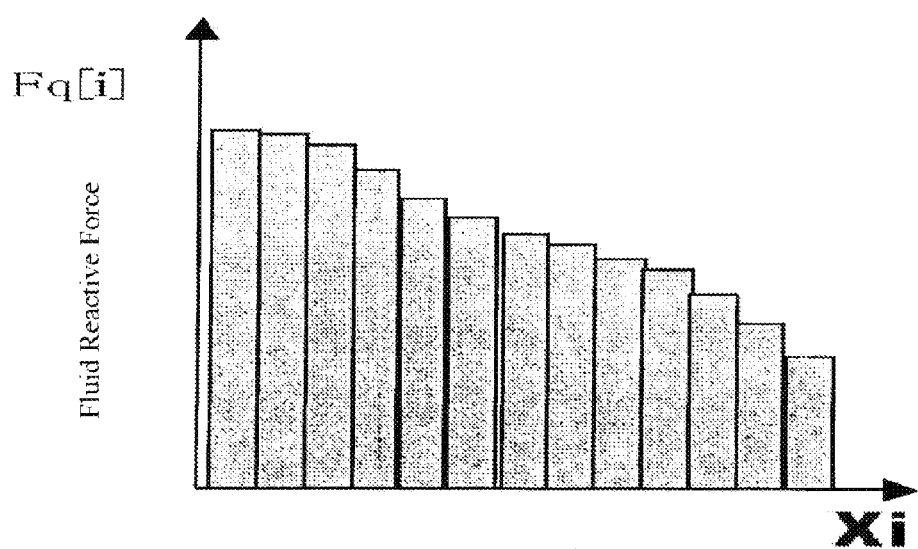
FIG. 12 is a diagram showing a fluid reactive force that is calculated for each category i.

After calculating the fluid reactive force Fq (i) for category i=1, the CPU 4 repeats the processing procedures of Step S501 through S504 while incrementing i (Step S504) until i reaches 20 (Step S503: YES). Doing so causes the fluid reactive force (i) for category i to be calculated for each of the categories i (referencing FIG. 12).

Additionally, after calculating the fluid reactive forces Fq (i) for each category i, the CPU 4 then uses the fluid reactive forces Fq (i) calculated for each of the categories i as fault check indicator values and compares the fluid reactive forces Fq (i) to threshold values that have been established in advance (Step S108 (FIG. 4)), and if even one of the fluid reactive forces Fq (i) exceeds a threshold value (Step S108: YES), provides a fault notification (Step S109).

After the fault notification of Step S109, or in response to NO in Step S108, the CPU 4 resets all of the maximum values Max_p (i) and minimum values Min_p (i) for the operating device pressures Po in all of the categories i to the default values (Step S110), returns to the procedure of Step S101, and repeats the same operating procedures.

Figure 9:
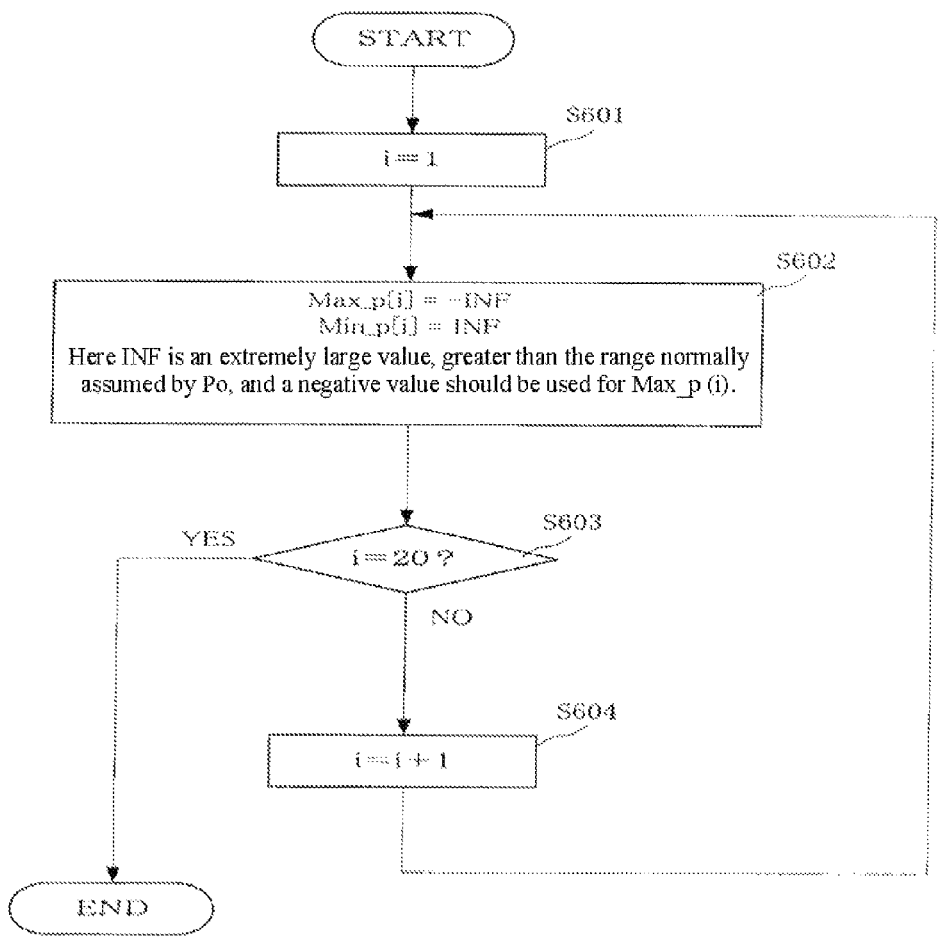
FIG. 9 is a diagram illustrating a subroutine for a process for resetting the maximum value and minimum value for the operating device pressures for all of the categories i to their default values in the flowchart shown in FIG. 4.

FIG. 9 illustrates the subroutine of the process that is performed in Step S110. The CPU 4 first sets i=1 (Step S601). It then sets Max_p (i)=−INF, and Min_p (i)=INF. Here INF is an extremely large value (a positive value), in excess of a range that would normally be assumed by the operating device pressure Po. As a result, Min_p (i) will be set to a positive value (the default value) in excess of the range that would normally be assumed by the operating device pressure Po, and Max_p (i) is set to the negative value that is the inverse of Min_p (i) (the default value).

After setting Max_p (i) and the minimum value Min_p (i) for category i=1 to the default values, the CPU 4 repeats the processing operations of Step S601 through S604, while incrementing i (Step S604) until i=20 (Step S603: YES). As a result, Max_p (i) and the minimum value Min_p (i) for category i are set to the default values for all of the categories.

By setting Max_p (i) to −INF (a negative value) and the minimum value Min_p (i) to INF (a positive value) for the category i, for each category i, in Step S110 and then returning processing to Step S101, the values of Max_p (i) and Min_p (i) will be updated to Po (k), regardless of the value that arrives for the operating device pressure Po (k) when the updating procedure for Max_p (i) and the minimum value Min_p (i) is performed in Step S104.

At the point in time wherein the fault check evaluation time interval elapses, if Max_p (i) and/or Min_p (i) of the i$^{th}$ category have not been updated even once, that is, if the default values remain, then the fluid reactive force calculation is not performed in Step S107, and it is assumed that the fluid reactive force for the $i^{th}$ category cannot be calculated, so the threshold value evaluation is not performed.

In this way, in the first embodiment, those data that deviate greatly from the characteristic I that represents the steady-state input/output relationship, when operating properly, during processing operations are eliminated, and the fault check of the regulator valve 200 is performed accurately using the simple steady-state model.

Figure 13:
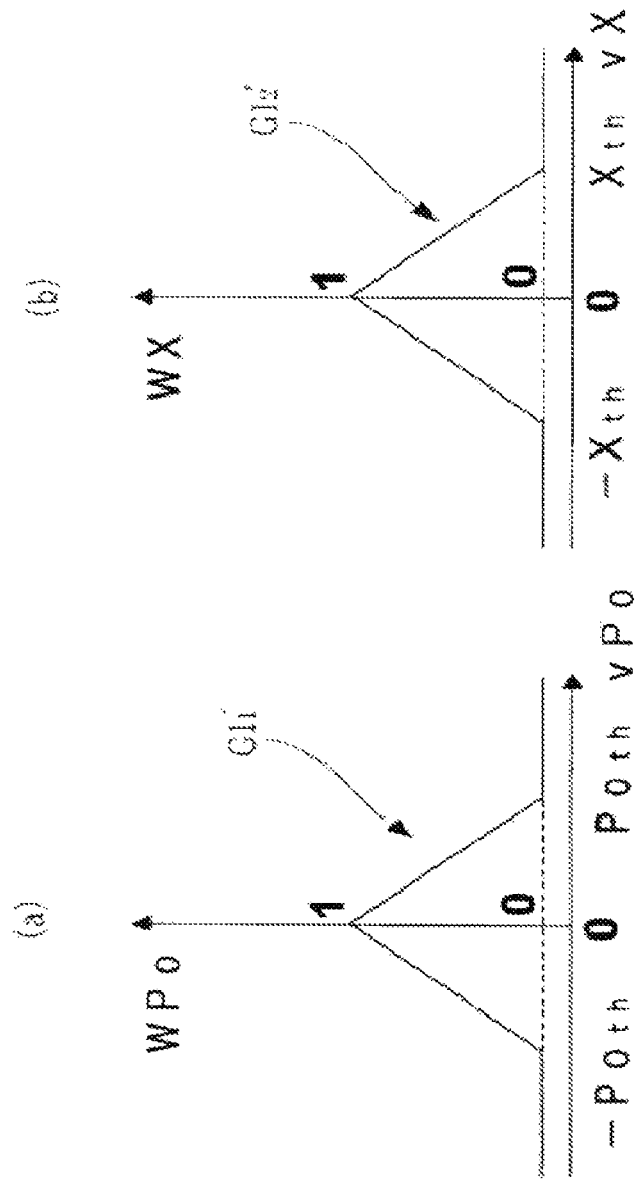
FIG. 13 is a diagram showing another example of a weighting function used in the fault checking device of the first embodiment.

Note that while in the first embodiment weighting functions $G1_1$ and $G1_2$ are used for calculating weightings according to the combinations of the speed of change of the operating device pressure Po and the speed of change of the degree of opening X, where rectangular weighting functions such as shown in FIGS. 3(a) and (b) are used, a triangular weighting function such as shown in FIGS. 13(a) and (b) may be used instead.

In the weighting function $G1_1'$, shown in FIG. 13(a), if vPo is 0, then wPo is set to 1, but in the range wherein the absolute value of vPo is no greater than the threshold value Poth, instead wPo may gradually grow larger toward vPo=0, where otherwise wPo is 0. In the weighting function $G1_2'$ shown in FIG. 13(b), wX is 1 if vX is 0, wherein a range wherein the absolute value of vX is no larger than the threshold value Xth, wX may gradually grow larger towards vX=0, and wX is 0 otherwise.

Moreover, instead, in the weighting function $G1_1'$, for example, illustrated in FIG. 13(a), wPo may be made larger as vPo gradually approaches vPo=0 from positions that are further separated in the positive direction or negative direction, and in the weighting function $G1_2'$ illustrated in FIG. 13(b), wX may be made gradually larger as vX approaches vX=0 from positions that are further separated in the positive direction or the negative direction.

Moreover, the weighting function for calculating the weighting depending on the combination of the speed of change of the operating device pressure Po and the speed of change of the degree of opening X need not necessarily be divided into weighting functions $G1_1$ and $G1_2$, but rather may be a single weighting function that combines $G1_1$ and $G1_2$ (a three-dimensional function). The same is true for the triangular weighting functions $G1_1'$ and $G1_2'$, which may be a single weighting function combining $G1_1'$ and $G1_2'$ (a three-dimensional function).

While in the fault checking device 300 according to the first embodiment the fault checking for the regulator valve 200 is performed as operating procedures of the CPU 4 following a program PG, when the functions performed by the operating procedures by the CPU 4 are expressed as blocks, the CPU 4 can be expressed as an operating device pressure sampling portion $41_1$ for sampling periodically the operating device pressure Po that is inputted into the regulator valve 200, an opening sampling portion $42_1$ for sampling periodically the degree of opening X that is outputted from the regulator valve 200, an operating device pressure change speed calculating portion $43_1$ for calculating the speed of change vPo (k) of the operating device pressure Po (k) from the current operating device pressure Po (k) and the previous operating device pressure Po (k −1), sampled by the operating device pressure sampling portion $41_1$, an opening change speed calculating portion $44_1$ for calculating the speed of change vX (k) of the degree of opening X (k) from the current degree of opening X (k) and the previous degree of opening X (k −1), sampled by the opening sampling portion $42_1$, a weighting calculating portion $45_1$ for calculating the weighting w1 (k) in accordance with the combination of the speed of change vPo (k) of the operating device pressure Po (k) and the speed of change vX (k) of the degree of opening X, based on the weighting functions $G1_1$ and $G1_2$ that are stored in the memory portion 5, and a fault check indicator value calculating portion $46_1$ for calculating the fault check indicator value Fq (i) for each category i for the regulator valve 200 during the fault check evaluation time interval from the operating device pressure Po (k), sampled by the operating device pressure sampling portion $41_1$, the degree of opening X (k), sampled by the opening sampling portion $42_1$, the weighting w1 (k), calculated by the weighting calculating portion $45_1$, and the linear approximation formula F1 that is stored in the memory portion 5.

Note that while in the first embodiment the speed of change vPo (k) of the operating device pressure Po (k) is calculated from the current operating device pressure Po (k) and the previous operating device pressure Po (k −1) and the speed of change vX (k) of the degree of opening X (k) is calculated from the current degree of opening X (k) and the previous degree of opening X (k −1), instead it is possible to perform a linear approximation calculation using the least-squares method using a signal over a specific time interval from the past and then to use the rate of change of the slope of the approximation equation.

Second Embodiment

Figure 14:
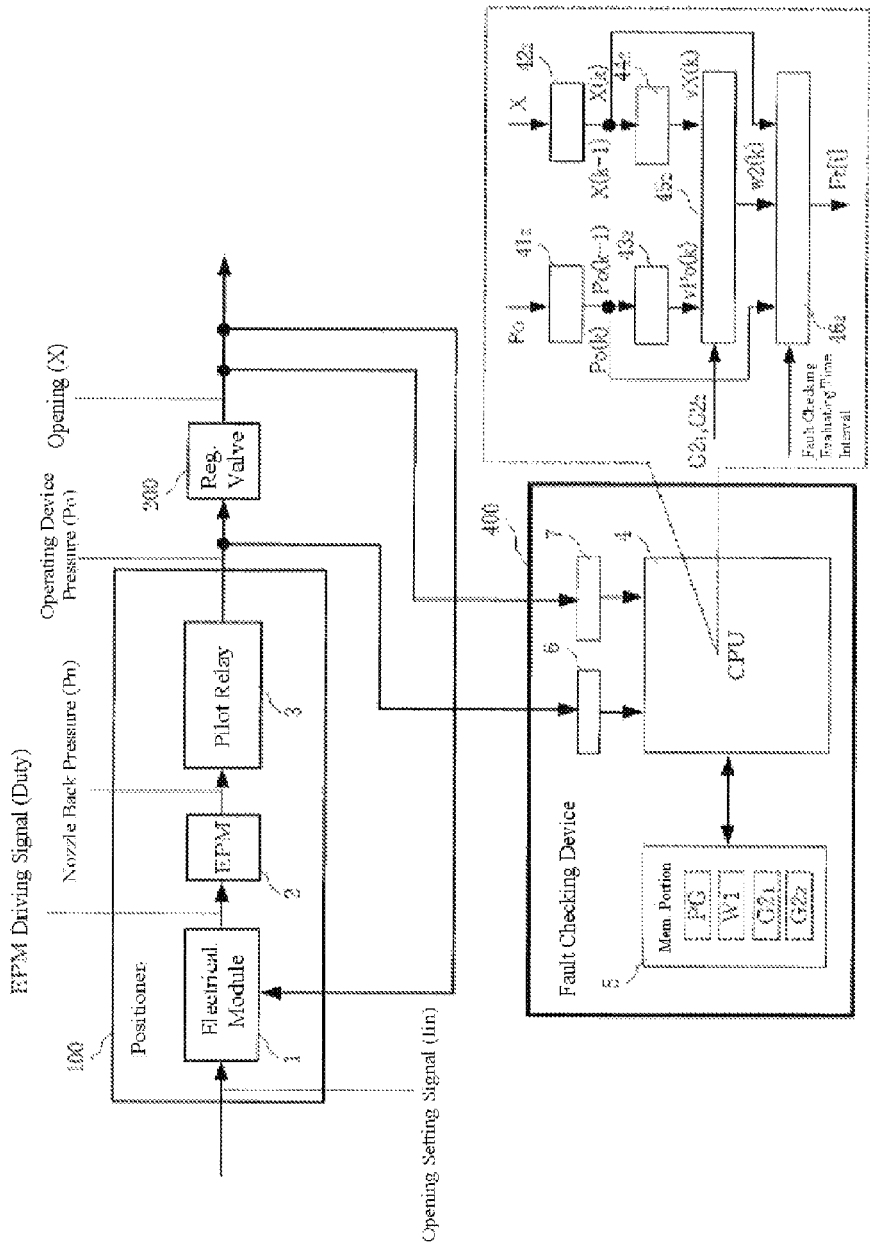
FIG. 14 is a diagram illustrating the structures of the critical portions of another embodiment (second embodiment) of a fault checking device that applies the fault checking method for the regulator valve according to the present disclosure.

FIG. 14 shows the structure of the critical components of a fault checking device 400 for performing fault checking for a regulator valve 200 using a value for the hysteresis width as the fault check indicator value. In the fault checking device 400 as well, as with the first embodiment, a CPU 4, a memory portion 5, such as a ROM or a RAM, and interfaces 6 and 7 are provided. Note that this fault checking device 400 may also be provided within the positioner 100 or the regulator valve 200, or may be provided outside of the positioner 100 and the regulator valve 200. FIG. 14 shows an example wherein it is provided outside of the positioner 100 and the regulator valve 200.

The operating device pressure Po that is the input signal into the regulator valve 200 is branched and inputted through the interface 6 into the CPU 4, and the degree of opening X, which is the output from the regulator valve 200, is branched and inputted through the interface 7 into the CPU 4. The CPU 4 operates in accordance with a program PG that is stored in the memory portion 5.

In addition to the program PG referenced above, a hysteresis width W1 in the characteristic (the hysteresis characteristics of the operating device pressure Po and the degree of opening X) that represents the input/output relationship, when operating properly, of the regulator valve 200, and weighting functions $G2_1$ and $G2_2$, for calculating weightings in accordance with combinations of the speed of change of the operating device pressure Po and the speed of change of the degree of opening X, are stored in the memory portion 5.

[Hysteresis Width W1]

Figure 15:
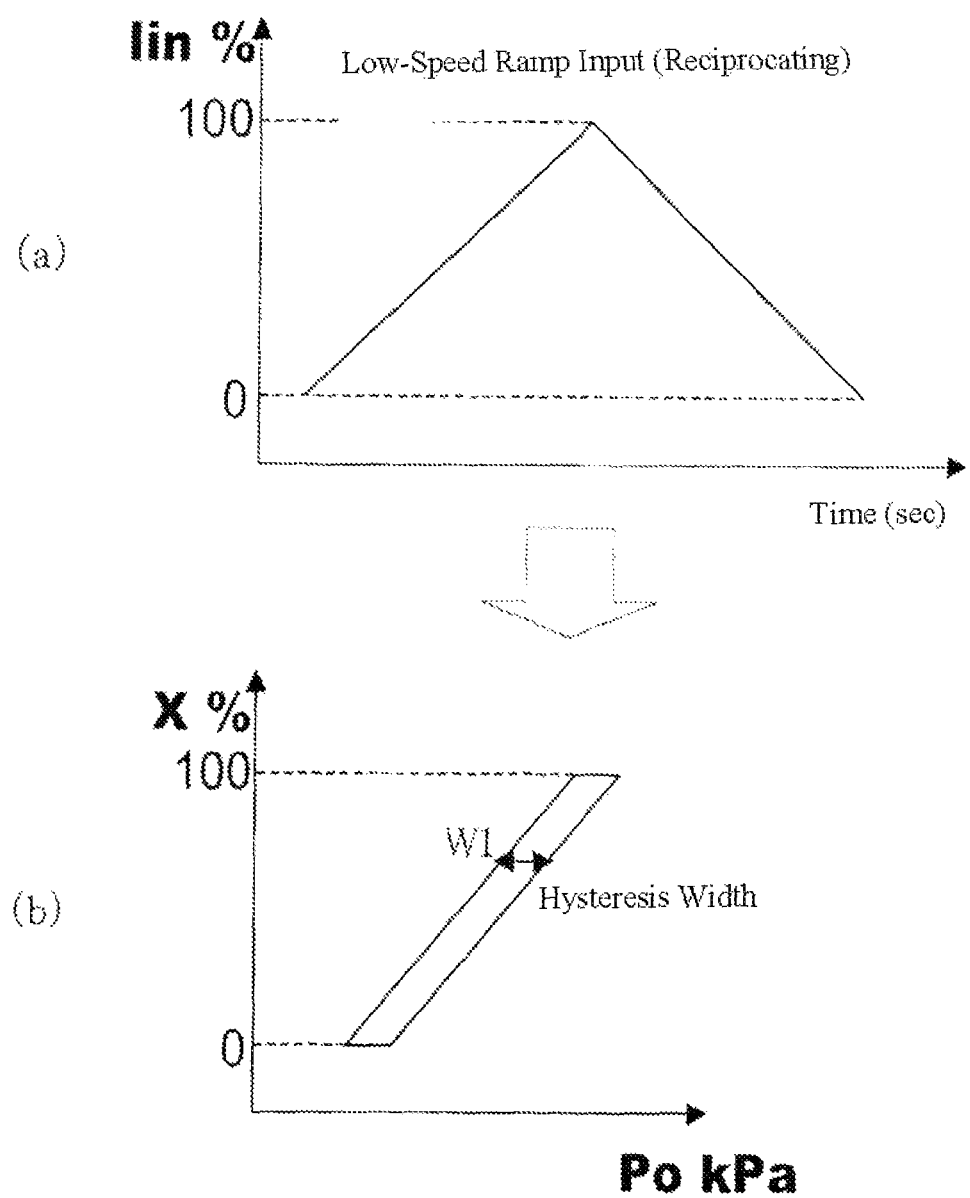
FIG. 15 is a diagram for explaining the method for calculating the hysteresis width of the input/output characteristic, when the regulator valve is operating properly, in, for example, a case wherein there are no design specifications for the regulator valve.

In this second embodiment, the hysteresis width W1 when the regulator valve 200 is operating properly is calculated from the design specification of the regulator valve 200 and stored in the memory portion 5. Note that if there is no design specification for the regulator valve 200, then, when in a proper operating state, such as immediately following maintenance, a low-speed ramped input may be applied to the positioner 100, reciprocating over the entire opening range thereof, as illustrated in FIG. 15(a), to obtain data for the operating device pressure Po and the opening X, as shown in FIG. 15(*b*), and the hysteresis width W1, when operating properly, may be calculated from the result.

[Weighting Functions $G2_1$ and $G2_2$]

Figure 3:
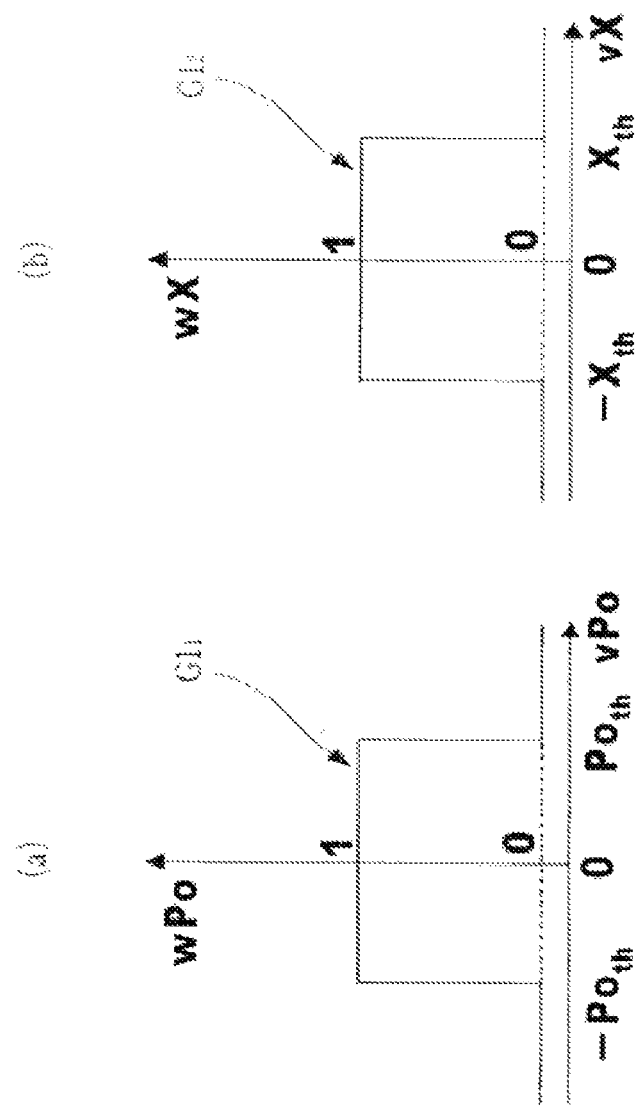
FIG. 3 is a diagram illustrating one example of a weighting function used in the fault checking device according to the first embodiment.
Figure 16:
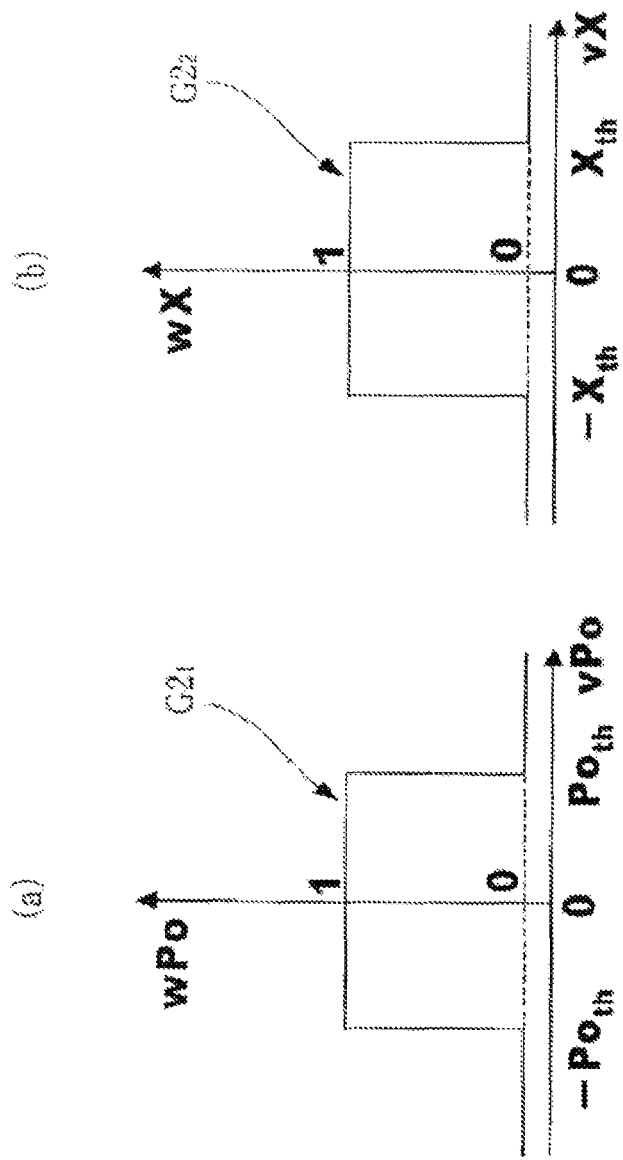
FIG. 16 is a diagram illustrating one example of a weighting function used in the fault checking device in the second embodiment.

In the present embodiment, the weighting functions $G2_1$ and $G2_2$, as illustrated in FIGS. 16(*a*) and (*b*), are the same as those of the weighting functions $G1_1$ and $G1_2$ described in the first embodiment (FIGS. 3(*a*) and (*b*)), so explanations are omitted here.

[Fault Checks During Processing Operations]

Figure 17:
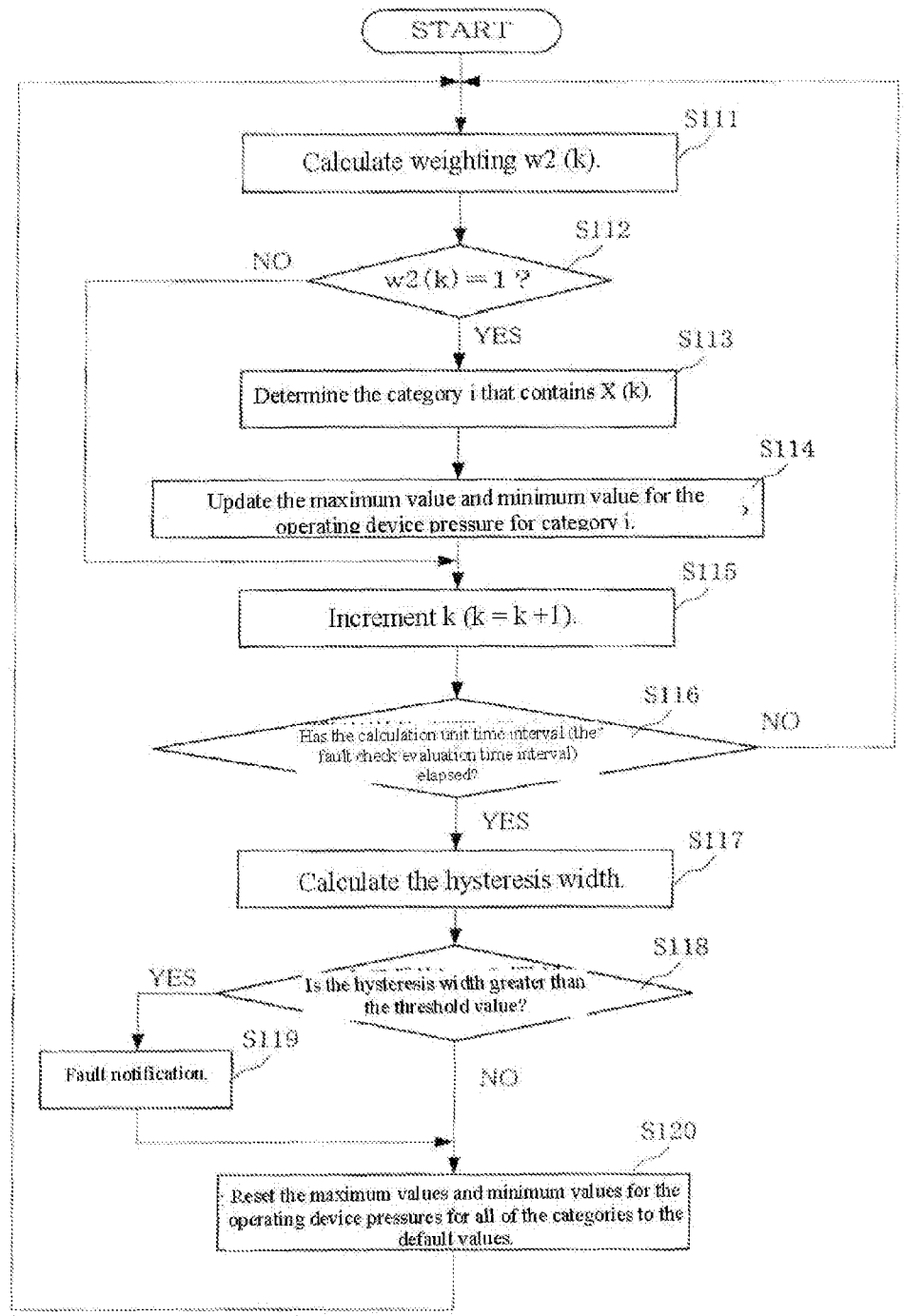
FIG. 17 is a flowchart for the fault checking procedure that is performed by the CPU in the fault checking device according to the second embodiment.

During processing operations, the CPU 4 periodically reads in the operating device pressure Po that is inputted into the regulator valve 200 and the degree of opening X that is outputted from the regulator valve 200, to perform the fault checking on the regulator valve 200. FIG. 17 shows a main flowchart for the fault checking process that is performed by the CPU 4.

In this flowchart, the procedures in Step S111 through S116 are the same as the procedures in Step S101 through S106 explained in the first embodiment (FIG. 4), and thus are omitted here.

[When the Fault Check Evaluation Time Interval has Expired]

Figure 18:
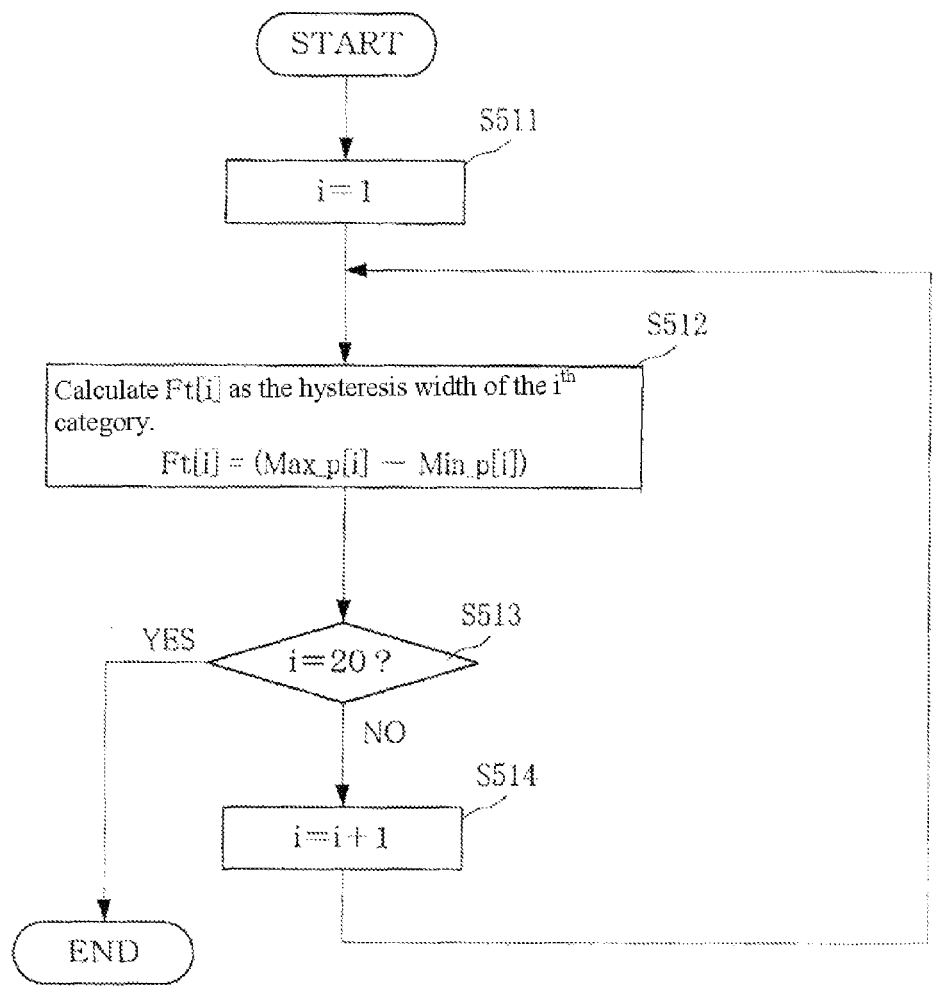
FIG. 18 is a diagram illustrating a subroutine for a process for calculating the hysteresis width for each category i in the flowchart shown in FIG. 17.

When the fault check evaluation time interval has expired (Step S116: YES), then the CPU 4 calculates the hysteresis width in each category i as a fault check indicator value (Step S117). FIG. 18 shows the subroutine for the process that is performed in Step S117.

Figure 19:
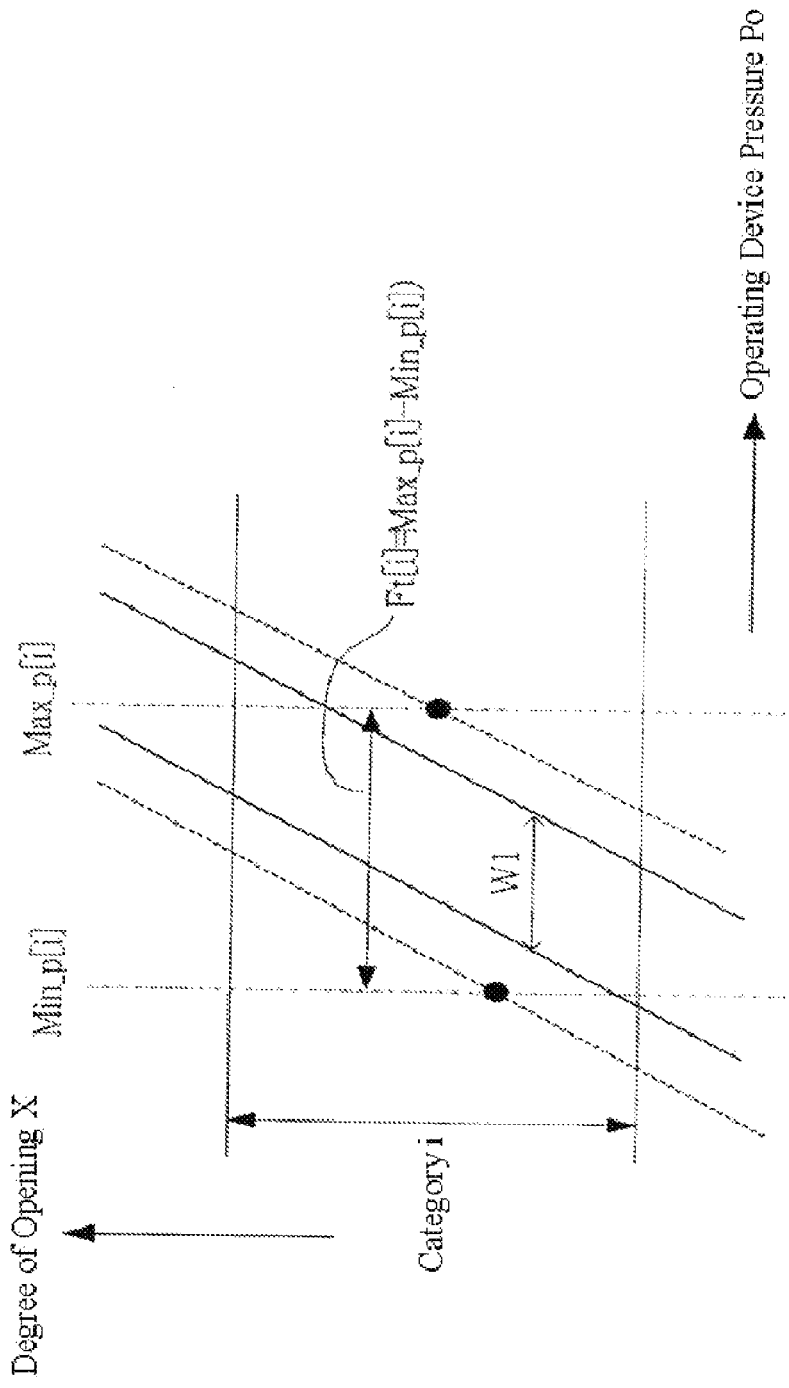
FIG. 19 is a diagram illustrating the state wherein the hysteresis width of the category i is calculated.

The CPU 4 first sets i=1 (Step S511). Given this, with Ft (i) defined as the hysteresis width for the i=1 category, the maximum value Max_p (i) and the minimum value Min_p (i) for the operating device pressure Po in that category i are substituted into Equation (5), below, to calculate the hysteresis width Ft (i) for the i=1 category (Step S512, see FIG. 19).

$$Ft(i)=\text{Max}\_p(i)-\text{Min}\_p(i) \quad (5)$$

Figure 20:
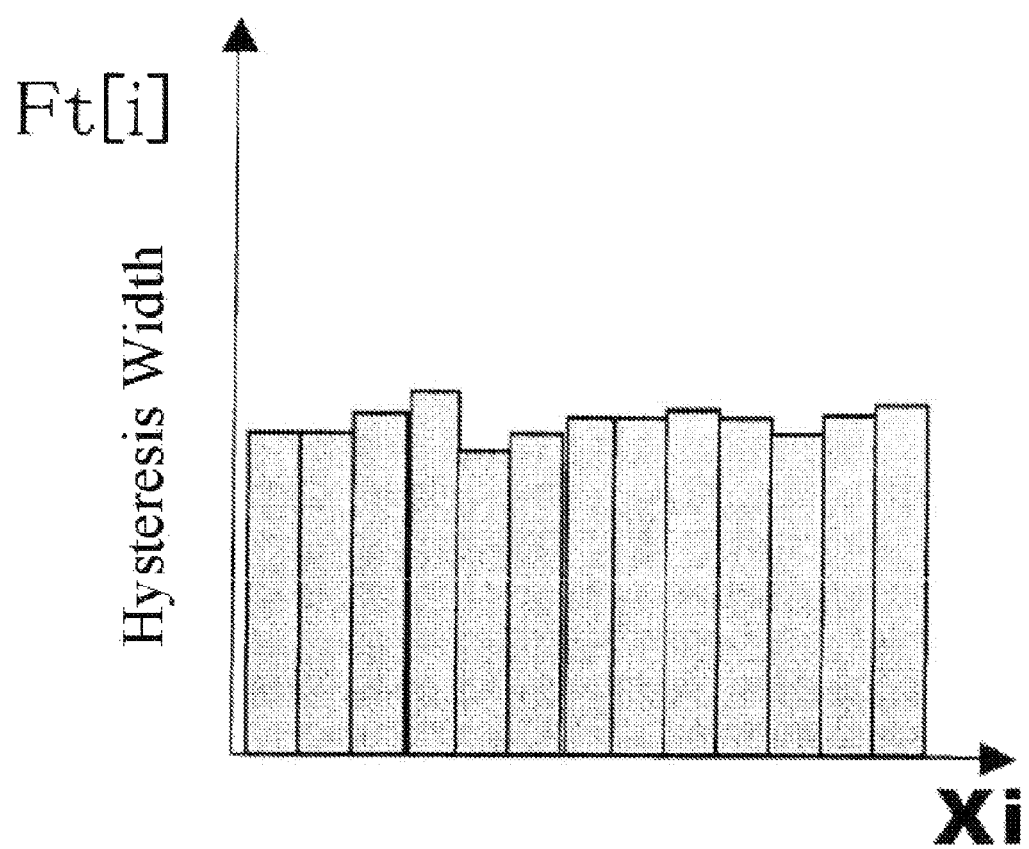
FIG. 20 is a diagram illustrating the width of hysteresis calculated for each category i.

After calculating the hysteresis width Ft (i) for category i=1, the CPU 4 repeats the processing procedures of Step S511 through S514 while incrementing i (Step S514) until i reaches 20 (Step S513: YES). Doing so causes the hysteresis width (i) for category i to be calculated for each of the categories i (referencing FIG. 20).

Additionally, after calculating the hysteresis width Ft (i) for each category i, the CPU 4 then reads in the hysteresis width W1 from the time of normal operation, stored in the memory portion 5, and uses as a threshold value a value wherein a specific value α has been added to this hysteresis width W1 to compare the hysteresis widths Ft (i) to this threshold values (Step S118 (FIG. 17)), and if even one of the flow hysteresis widths Ft (i) exceeds a threshold value (Step S118: YES), provides a fault notification (Step S119).

After the fault notification of Step S119, or in response to NO in Step S118, the CPU 4 resets all of the maximum values Max_p (i) and minimum values Min_p (i) for the operating device pressures Po in all of the categories i to the default values (Step S120), returns to the procedure of Step S111, and repeats the same operating procedures. The resetting to the default values in Step S120 is the same as the operating procedure in Step S110 in the first embodiment (FIG. 4), so the explanation thereof will be omitted here.

In this way, in the second embodiment, those data that deviate greatly from the hysteresis width, when operating properly, during processing operations are eliminated, and the fault check of the regulator valve 200 is performed accurately using the hysteresis width.

Figure 22:
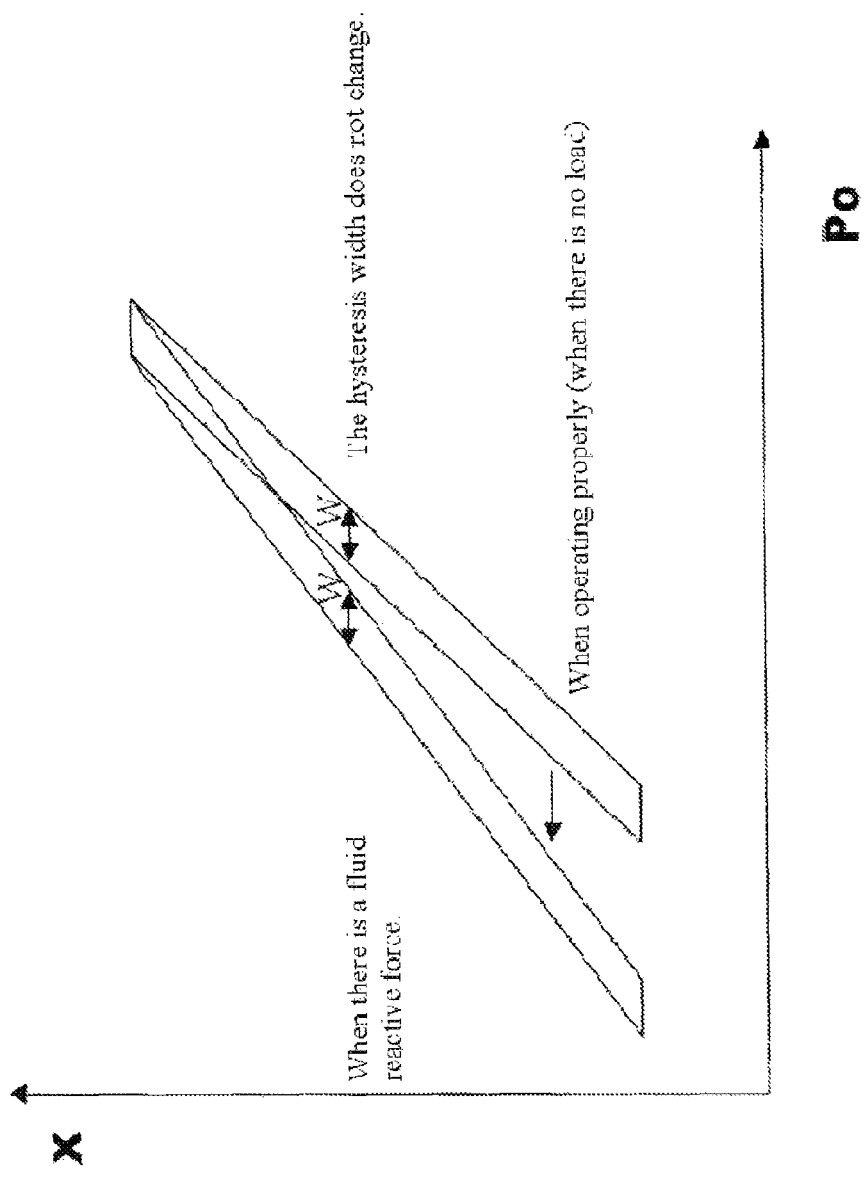
FIG. 22 is a diagram illustrating the state wherein there is no large change in the width of hysteresis due to the fluid reactive force.
Figure 23:
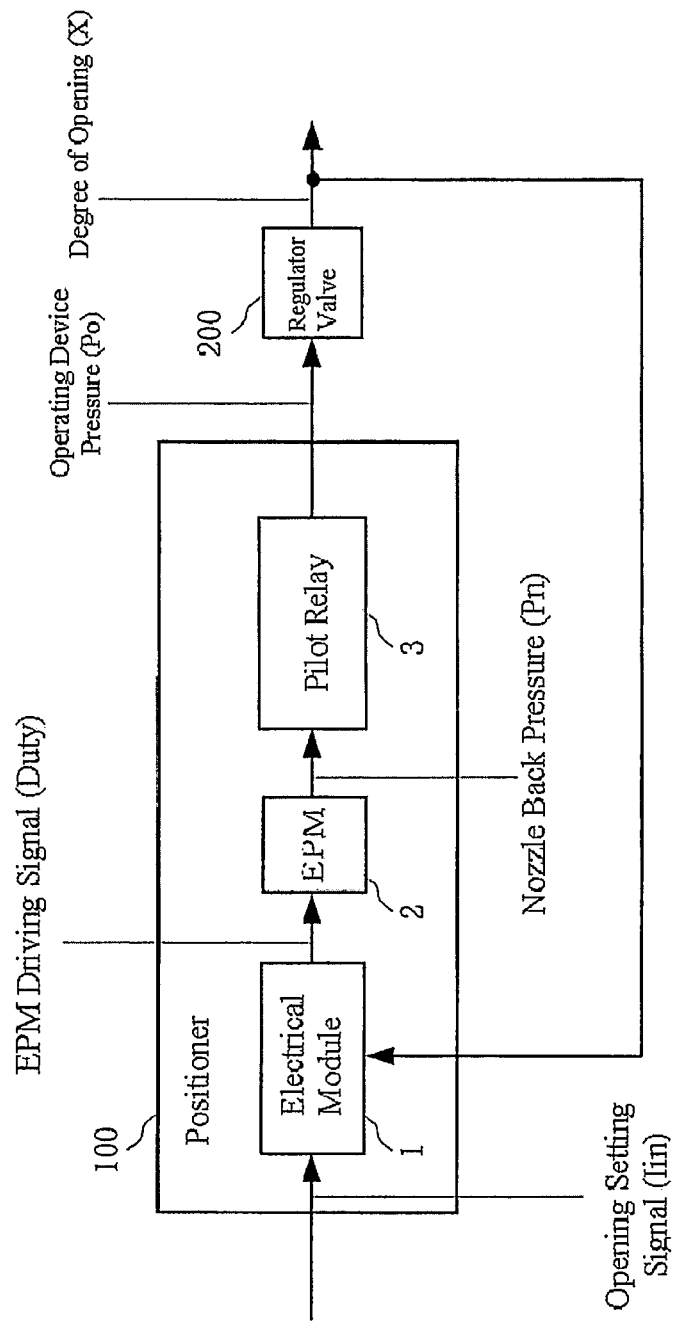
FIG. 23 is a diagram illustrating the flow of the input/output signals in a system that combines a positioner and a regulator valve.
Figure 24:
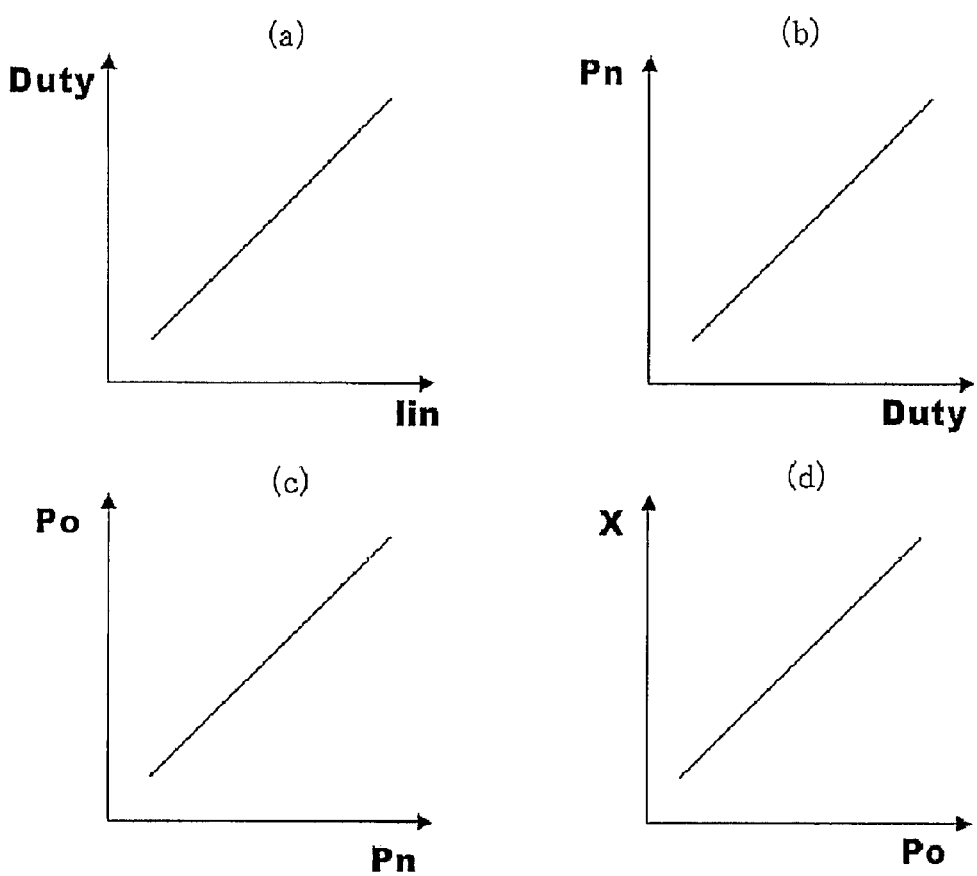
FIG. 24 is a diagram of a linear approximation of the steady-state input/output relationships, when operating properly, of the various modules of the positioner (the electrical module, the EPM, and the pilot relay) and the regulator valve.
Figure 25:
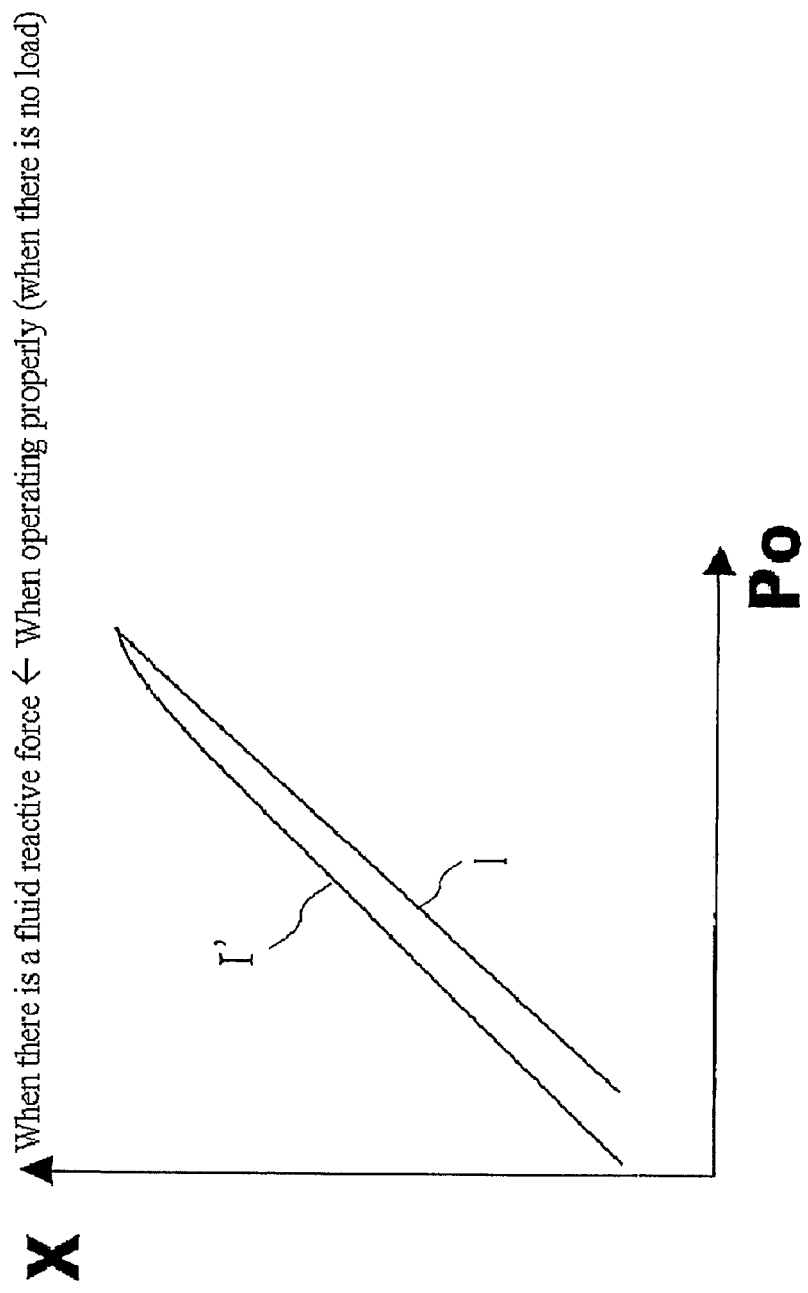
FIG. 25 is a diagram illustrating the change in the input/output relationship of the regulator valve when there is a fluid reactive force.
Figure 26:
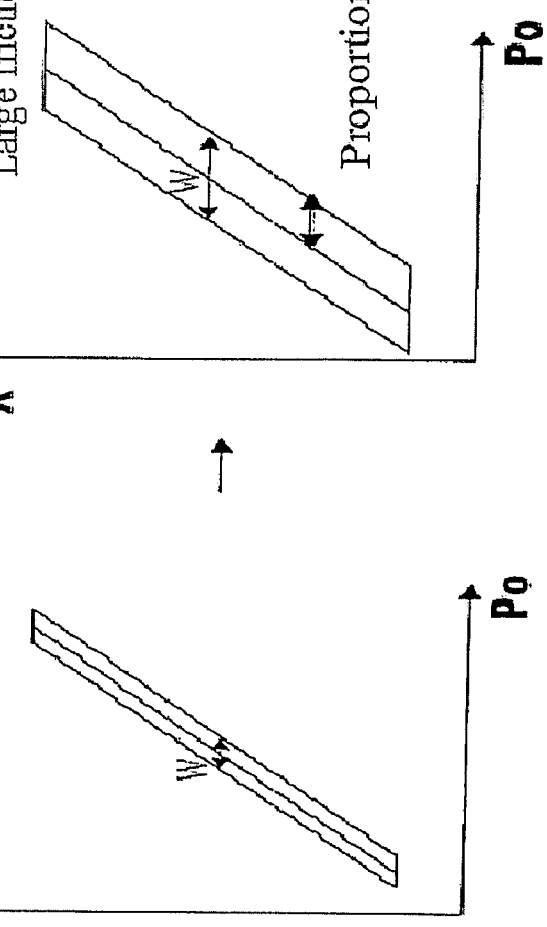
FIG. 26 is a diagram for explaining the hysteresis width of the input/output characteristic of the regulator valve that changes due to the frictional force.
Figure 27:
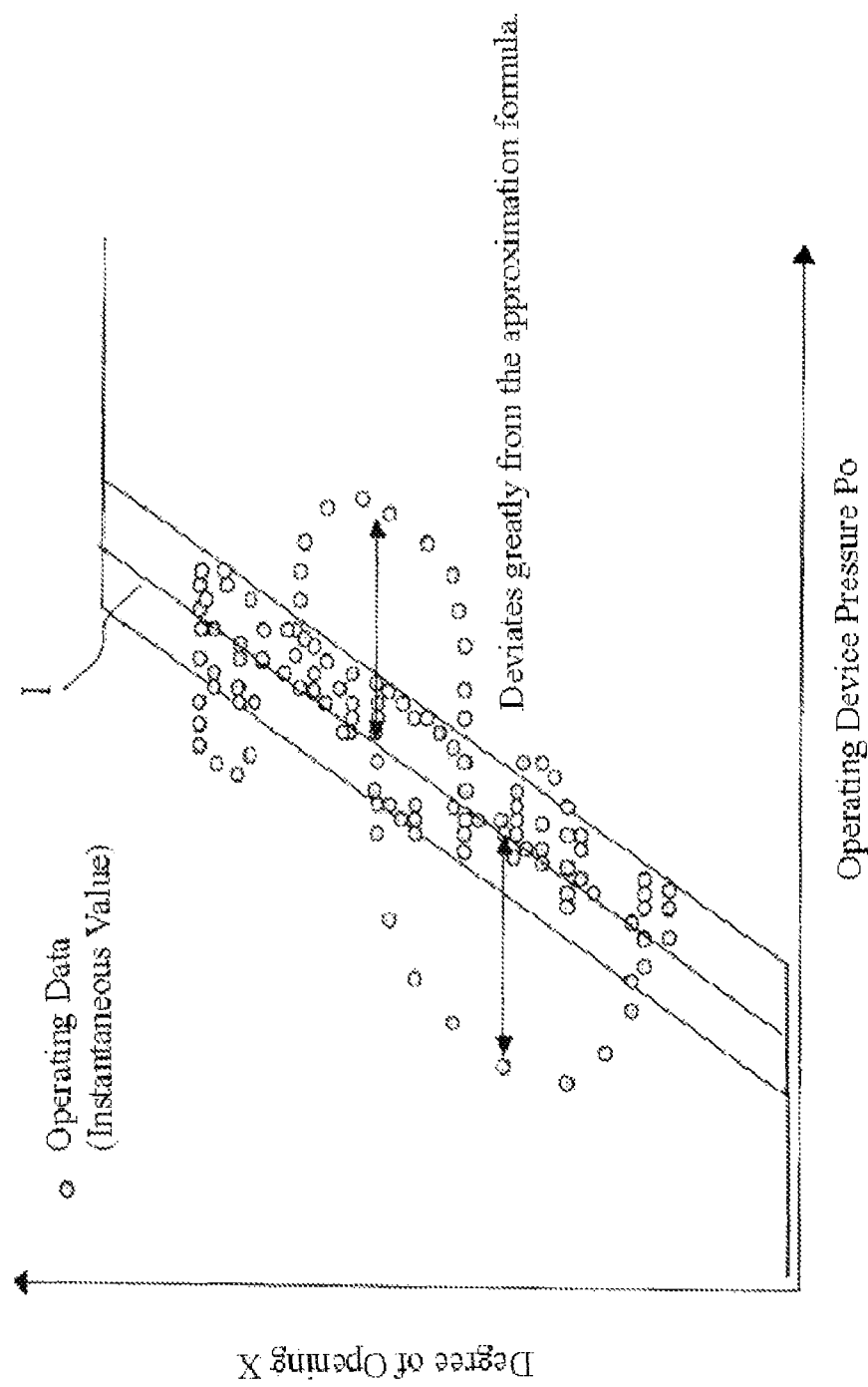
FIG. 27 is a diagram illustrating the state wherein the input/output relationship deviates greatly from the steady-state input/output relationship, when operating properly, due to a delay when the regulator valve is moved quickly during processing operations.
Figure 28:
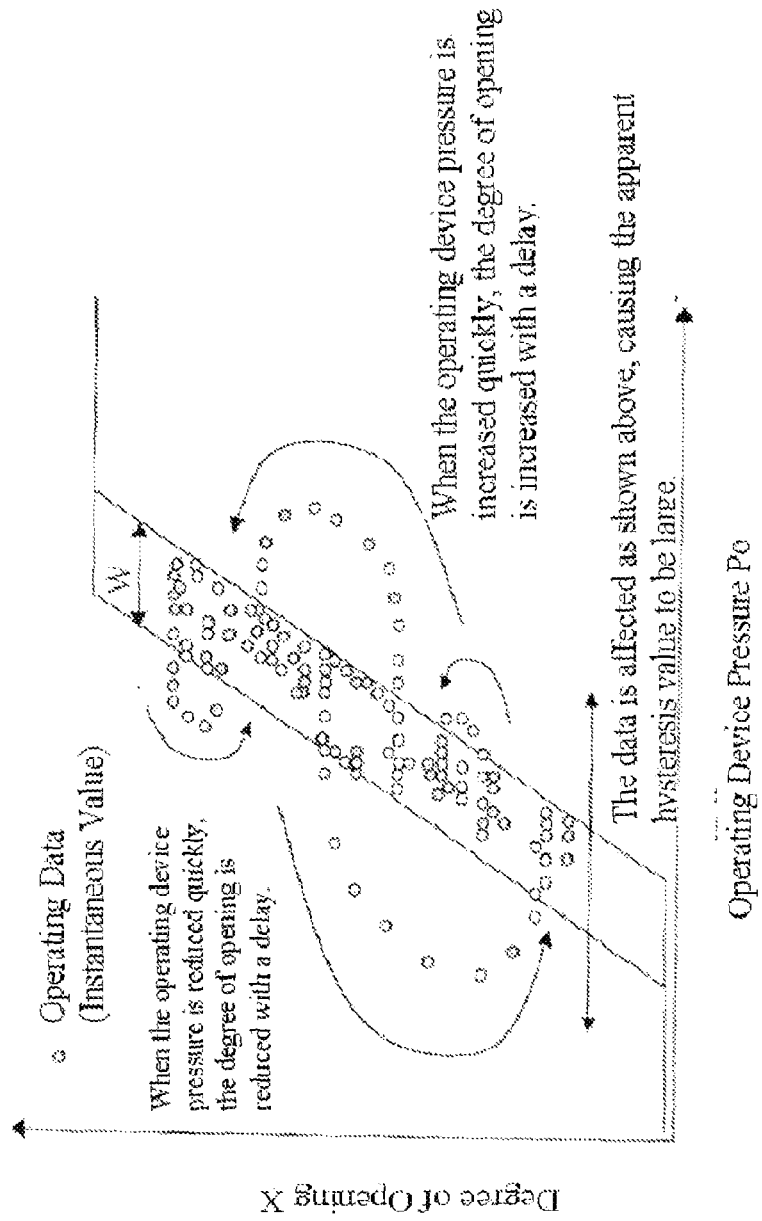
FIG. 28 is a diagram illustrating the state wherein the calculated width of hysteresis of the input/output characteristic is large due to the delay when the regulator valve is moved quickly during processing operations.

Note that as shown in the first embodiment, the valve shaft is affected by the fluid reactive force during operation, changing the relationship between the operating device pressure Po and the degree of opening X. However, the hysteresis width W is dependent on the frictional force, and, as shown in FIG. 22, is not changed greatly by the fluid reactive force. Because of this, the second embodiment does not cease to be effective even under the influence of the fluid reactive force.

While in the fault checking device 400 according to the second embodiment the fault checking for the regulator valve 200 is performed as an operating procedure of the CPU 4 following a program PG, when the functions performed by the operating procedure by the CPU 4 are expressed as blocks, the CPU 4 can be expressed as an operating device pressure sampling portion $41_2$ for sampling periodically the operating device pressure Po that is inputted into the regulator valve 200, an opening sampling portion $42_2$ for sampling periodically the degree of opening X that is outputted from the regulator valve 200, an operating device pressure change speed calculating portion $43_2$ for calculating the speed of change vPo (k) of the operating device pressure Po (k) from the current operating device pressure Po (k) and the previous operating device pressure Po (k −1), sampled by the operating device pressure sampling portion $41_2$, an opening change speed calculating portion $44_2$ for calculating the speed of change vX (k) of the degree of opening X (k) from the current degree of opening X (k) and the previous degree of opening X (k −1), sampled by the opening sampling portion $42_2$, a weighting calculating portion $45_2$ for calculating the weighting $w_2$ (k) in accordance with the combination of the speed of change vPo (k) of the operating device pressure Po (k) and the speed of change vX (k) of the degree of opening X, based on the weighting functions $G2_1$ and $G2_2$ that are stored in the memory portion 5, and a fault checking portion $46_2$ for calculating the fault check indicator value Ft (i) for each category i for the regulator valve 200 during the fault check evaluation time interval from the operating device pressure Po (k), sampled by the operating device pressure sampling portion $41_2$, the degree of opening X (k), sampled by the opening sampling portion $42_2$, and the weighting $w_2$ (k), calculated by the weighting calculating portion $45_2$.

Note that while in the second embodiment the speed of change vPo (k) of the operating device pressure Po (k) is calculated from the current operating device pressure Po (k) and the previous operating device pressure Po (k −1) and the speed of change vX (k) of the degree of opening X (k) is calculated from the current degree of opening X (k) and the previous degree of opening X (k −1), instead it is possible to perform a linear approximation calculation using the least-squares method using a signal over a specific time interval from the past and then to use the rate of change of the slope of the approximation equation.

Figure 21:
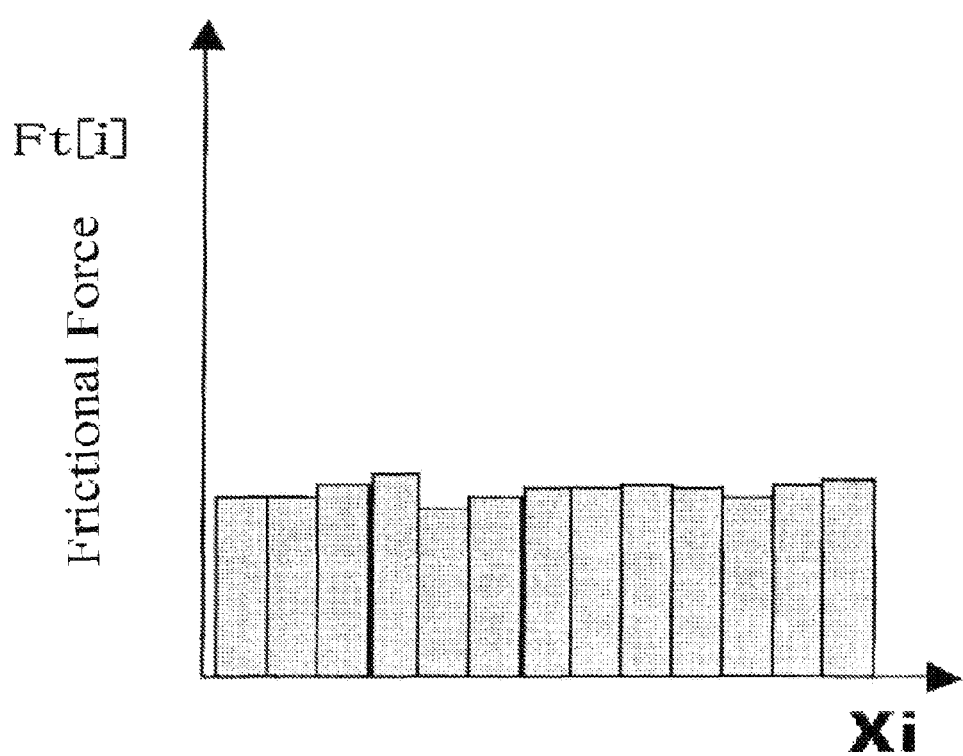
FIG. 21 is a diagram illustrating the frictional force that is calculated for each category i.

Moreover, while in the second embodiment the hysteresis width is calculated for each category i as Ft (i)=Max_p (i)−Min_p (i) in Step S117, the frictional force may be calculated for each category i as Ft (i)=(Max_p (i)−Min_p (i))/2. (See FIG. 21.)

If the frictional force is used for Ft (i), that, in Step S118, the hysteresis width W1 for the time of proper operation, which is stored in the memory portion 5, may be read out, a half value for this hysteresis width W1 (W½) may be calculated, and a value where this half value (W½) of the hysteresis width W1 is added by a specific value β may be used as the threshold value, where this threshold value may be compared to the frictional force Ft (i). Conversely, the half value (W½) of the hysteresis width W1 when operating properly may be stored in the memory portion 5, and a value where this half value (W½) of the hysteresis width W1 is added by a specific value β may be used as the threshold value, where this threshold value may be compared to the frictional force Ft (i). While in this case Ft (i) is a pressure (kPa), the units can be converted from a pressure (kPa) into a force (N) through multiplying by the surface area of the diaphragm of the operating device $(m^2) \times 10^{-3}$.

Moreover, while in the embodiments set forth above the explanation is for performing fault checking on a regulator valve 200, instead fault checking may be performed in the same manner as described above, when the entire system wherein a positioner and a regulator valve are combined is considered to be a single regulator valve. In this case, the opening setting signal Iin that is the input signal into the positioner 100 would correspond to an input signal into the regulator valve, and the fault checking for the system as a whole (the regulator valve) would use this opening setting signal Iin and the degree of opening X.

The regulator valve fault checking method and device according to the present disclosure may be used in checking for faults in regulator valves used in fluid flow rate processes in chemical plants, and the like, as a method for checking for faults in regulator valves for adjusting flows of fluids.

What is claimed is:

1. A regulator valve fault checking method for performing fault checking of a regulator valve regulating the flow of a fluid, comprising the steps of:
   periodically sampling a signal inputted into the regulator valve and, a degree of valve opening outputted from the regulator valve;
   calculating a speed of change of the sampled input signal;
   calculating a speed of change of the sampled degree of valve opening;
   calculating a weighting using the speed of change of the input signal and the speed of change of the degree of valve opening, and a weighting function that has been established in advance; and
   fault checking of the regulator valve using the sampled input signal, the sampled degree of valve opening and the calculated weighting,
   wherein the weighting function is a function where the weighting is large when the absolute values of the speed of change of the input signal and the speed of change of the valve opening are in ranges that are less than threshold values,
   wherein the step of performing the fault checking calculates a fault check indicator value, and
   wherein a specific time interval set in advance is used as a fault check evaluating interval, where the input signals and degrees of valve opening for which the weightings are calculated to be no less than a specific value are defined as valid data, and a fault check indicator value for use when performing fault checking of the regulator valve is calculated based on the input signals and degrees of valve opening that have been defined as valid data during the fault check evaluation time interval.

2. The regulator valve fault checking method as set forth in claim 1, wherein the input signal is an operating device pressure inputted into the regulator valve,
   wherein the step of performing the fault checking further comprises the steps of:
      calculating a fault check indicator value, used in fault checking of the regulator valve, from the sampled input signal and the sampled degree of valve opening, the calculated weighting, and a steady-state input/output relationship of the regulator valve when operating properly,
      calculating a center value between a maximum value and a minimum value for the operating device pressure for each individual degree-of-opening category, established in advance, from the operating device pressures and degrees of valve opening defined as valid data during the fault check evaluation time interval, and
      calculating, as a fault check indicator value, a value indicating a difference between the center value of the operating device pressure in each degree-of-opening category and a steady-state input/output relationship, during proper operation, of the regulator valve.

3. The regulator valve fault checking method as set forth in claim 1, wherein the input signal is an operating device pressure that is inputted into the regulator valve,
   wherein the weighting function is a function wherein the weighting is large when the speed of change of the input signal and the speed of change of the valve opening are small, and
   wherein the step of performing the fault checking further comprises the steps of:
      calculating a difference between a maximum value and a minimum value for the operating device pressure for each individual degree-of-opening category, established in advance, from the operating device pressures and degrees of valve opening defined as valid data during the fault check evaluation time interval, and
      calculating, as a fault check indicator value, a value indicating a difference between the maximum value and the minimum value of the operating device pressure in each degree-of-opening category.

4. A method to perform fault checking of a regulator valve regulating the flow of a fluid, comprising the steps of:
   periodically sampling, using a processor, a degree of valve opening of the regulator valve;
   calculating, using the processor, a rate of change of the sampled degree of valve opening;
   periodically sampling, using the processor, an input signal sent to the regulator valve;
   calculating, using the processor, a rate of change of the sampled input signal;
   retrieving, from a non-transitory memory, a predetermined weighting function;
   calculating a weighting, using the processor, based on the rate of change of the sampled degree of valve opening, the rate of change of the sampled input signal and the predetermined weighting function; and
   fault checking the regulator valve based on the sampled degree of valve opening of the regulator valve, the sampled input signal sent to the regulator valve, and the weighting.

5. The method of claim 4, wherein the fault checking step comprises the step of calculating a fault check indicator value based on the sampled input signal, the sampled degree of valve opening, the weighting, and a steady-state input/output relationship of the regulator valve when operating properly,
   wherein the steady-state input/output relationship is stored in the memory.

6. The method of claim 4, wherein the weighting function is large when the rate of change of the input signal and the rate of change of the valve opening are small.

7. The method of claim 4, wherein the calculating the weighting step further comprises the steps of:
   determining an absolute value of the rate of change of the input signal; and
   determining an absolute value of the rate of change of the valve opening;

wherein the weighting function is large when the absolute values of the rate of change of the input signal and the rate of change of the valve opening are in ranges that are less than threshold values.

8. The method of claim 4, wherein the fault checking step comprises the steps of:
- setting, in advance, a specific time interval as a fault check evaluating interval;
- defining valid data as the input signals and degrees of valve opening used in the calculating the weightings step which are calculated to be no less than a specific value; and
- calculating a fault check indicator value based on the valid data during the fault check evaluation time interval.

9. The method of claim 8, further comprising the step of setting the input signal as an operating device pressure inputted into the regulator valve;
wherein the fault checking step comprises the steps of:
- establishing in advance, a plurality of individual degree-of-opening categories;
- calculating a center value between a maximum value of the operating device pressure and a minimum value of the operating device pressure for each individual degree-of-opening category based on the operating device pressures and degrees of valve opening defined as valid data during the fault check evaluation time interval; and
- calculating a fault check indicator value indicating a difference between the center value in each degree-of-opening category and a steady-state input/output relationship of the regulator valve during proper operation.

10. The method of claim 8, further comprising the step of setting the input signal as an operating device pressure inputted into the regulator valve;
wherein the fault checking step comprises the steps of:
- establishing in advance, a plurality of individual degree-of-opening categories;
- calculating a difference between a maximum value of the operating device pressure and a minimum value of the operating device pressure for each individual degree-of-opening category based on the operating device pressures and degrees of valve opening defined as valid data during the fault check evaluation time interval; and
- calculating a fault check indicator value indicating a difference between the maximum value and the minimum value for the operating device pressure for each individual degree-of-opening category.

\* \* \* \* \*